US010738496B2

(12) United States Patent
Schmitt et al.

(10) Patent No.: US 10,738,496 B2
(45) Date of Patent: Aug. 11, 2020

(54) PARKING GARAGE FOR MOTOR VEHICLES, IN PARTICULAR MULTISTORY PARKING GARAGE, AND METHOD FOR MANUFACTURING A PARKING GARAGE

(71) Applicants: Vanessa Sophie Schmitt, Hamburg (DE); Thomas Kwak, Hamburg (DE); Rudolf Thorn, Hamburg (DE)

(72) Inventors: Vanessa Sophie Schmitt, Hamburg (DE); Thomas Kwak, Hamburg (DE); Rudolf Thorn, Hamburg (DE)

(73) Assignee: DPG DEUTSCHE PARKEN GMBH, Hamburg (DE)

( * ) Notice: Subject to any disclaimer, the term of this patent is extended or adjusted under 35 U.S.C. 154(b) by 0 days.

(21) Appl. No.: 15/412,246

(22) Filed: Jan. 23, 2017

(65) Prior Publication Data

US 2017/0211287 A1 Jul. 27, 2017

(30) Foreign Application Priority Data

Jan. 21, 2016 (EP) ..................................... 16152225

(51) Int. Cl.
*E04H 6/18* (2006.01)
*G07C 9/27* (2020.01)
(Continued)

(52) U.S. Cl.
CPC .............. *E04H 6/18* (2013.01); *E04H 6/181* (2013.01); *G07C 9/00896* (2013.01); *G07C 9/20* (2020.01); *G07C 9/27* (2020.01); *G06Q 2240/00* (2013.01)

(58) Field of Classification Search
CPC .......... E04H 6/302; E04H 6/181; E04H 6/12; E04H 6/18; G06Q 20/045; G06Q 2240/00;
(Continued)

(56) References Cited

U.S. PATENT DOCUMENTS 1,554,584 A * 9/1925 Lake ........................ E04H 6/181
182/14
2,598,413 A * 5/1952 Morley .................... E04H 6/287
414/240
(Continued)

FOREIGN PATENT DOCUMENTS

CN 103243950 9/2015
DE 102008026566 12/2009
(Continued)

*Primary Examiner* — Ryan D Kwiecinski
*Assistant Examiner* — Matthew J Gitlin
(74) *Attorney, Agent, or Firm* — Grogan, Tuccillo & Vanderleeden, LLP

(57) ABSTRACT

A parking garage for motor vehicles that can be easily, quickly and cost-effectively erected, and makes efficient use of limited space, in particular a multistory garage, is proposed, comprising a ground floor level and at least one parking floor level located above the ground floor level, a support structure with a shaft, at least one conveyor for the essentially vertical transport of motor vehicles, the conveyor being situated in the shaft of the support structure, the at least one parking floor level comprising at least one parking place for at least one motor vehicle, the parking garage being designed for transferring a motor vehicle between the conveyor and a parking position on the at least one parking place, the transfer being powered by the motor vehicle itself, such that a first side of at least one of the parking floor levels is located on the support structure.

19 Claims, 9 Drawing Sheets

(51) Int. Cl.
*G07C 9/00* (2020.01)
*G07C 9/20* (2020.01)

(58) Field of Classification Search
CPC ...... G07C 9/00896; G07C 2009/00928; G07C 1/30; G07C 9/00103; G07C 9/00007; G07C 2209/63; G07C 5/02; G07C 9/20; G07C 9/27; G08G 1/14
USPC .......................................................... 414/228
See application file for complete search history.

(56) References Cited

U.S. PATENT DOCUMENTS

| | | | | | |
|---|---|---|---|---|---|
| 2,663,435 | A | * | 12/1953 | Eliot | E04H 6/181 414/247 |
| 2,715,970 | A | * | 8/1955 | Carr | E04H 6/28 414/233 |
| 2,815,133 | A | * | 12/1957 | Asheim | E04H 6/183 414/246 |
| 2,846,186 | A | * | 8/1958 | Smith | E04H 6/183 254/2 R |
| 2,951,599 | A | * | 9/1960 | Bogar | E04H 6/183 414/256 |
| 2,995,263 | A | * | 8/1961 | Fitch | E04H 6/181 414/254 |
| 3,136,092 | A | * | 6/1964 | Contini | E04H 6/08 52/11 |
| 3,313,427 | A | * | 4/1967 | Inuzuka | E04H 6/422 414/232 |
| 3,330,083 | A | * | 7/1967 | Jaulmes | E04H 6/181 248/317 |
| 3,497,087 | A | * | 2/1970 | Vita | E04H 6/287 414/252 |
| 3,732,655 | A | * | 5/1973 | Termohlen | E04B 1/3404 52/167.1 |
| 3,813,835 | A | * | 6/1974 | Rice | E04B 1/34823 52/223.7 |
| 4,108,322 | A | * | 8/1978 | Kochanneck | E04H 6/287 414/263 |
| 4,109,804 | A | * | 8/1978 | Leon Moyano | E04H 6/186 414/254 |
| 4,870,790 | A | * | 10/1989 | Melzi | E04H 6/10 52/175 |
| 4,976,580 | A | * | 12/1990 | Knakrick | E04H 6/287 414/254 |
| 5,049,022 | A | * | 9/1991 | Wilson | E04H 6/186 414/253 |
| 5,173,027 | A | * | 12/1992 | Trevisani | B65G 1/06 414/235 |
| 5,243,796 | A | * | 9/1993 | Casini | E04H 6/225 414/239 |
| 5,278,395 | A | * | 1/1994 | Benezet | G07F 17/0014 235/384 |
| 5,432,508 | A | * | 7/1995 | Jackson | E04H 6/42 340/932.2 |
| 5,467,561 | A | * | 11/1995 | Takaoka | B60S 13/02 187/266 |
| 5,469,676 | A | * | 11/1995 | Colsman | E04H 6/28 52/174 |
| 5,478,182 | A | * | 12/1995 | Hildebrand | E04H 6/282 414/257 |
| 5,674,040 | A | * | 10/1997 | Wagner | B65G 1/045 414/263 |
| 5,829,941 | A | * | 11/1998 | Zamorano Morfin | E04H 6/282 414/261 |
| 6,212,832 | B1 | * | 4/2001 | Gao | E04H 6/225 414/261 |
| 2002/0146305 | A1 | * | 10/2002 | Haag | E04H 6/225 414/228 |
| 2003/0033772 | A1 | * | 2/2003 | Russell | E04B 1/3404 52/292 |
| 2006/0228196 | A1 | * | 10/2006 | Li | E04H 6/28 414/227 |
| 2007/0290888 | A1 | * | 12/2007 | Reif | G07B 15/02 340/932.2 |
| 2007/0294952 | A1 | * | 12/2007 | Li | E04H 6/285 52/30 |
| 2010/0017016 | A1 | * | 1/2010 | Zangerle | E04H 6/225 700/214 |
| 2010/0026521 | A1 | * | 2/2010 | Noel, II | G08G 1/042 340/932.2 |
| 2011/0313893 | A1 | * | 12/2011 | Weik, III | B60R 25/00 705/28 |
| 2012/0032635 | A1 | * | 2/2012 | Prosser | B60L 11/1816 320/109 |
| 2013/0073350 | A1 | * | 3/2013 | Blustein | G08G 1/14 705/13 |
| 2013/0117078 | A1 | * | 5/2013 | Weik, III | G06Q 10/00 705/13 |
| 2014/0266804 | A1 | * | 9/2014 | Asadpour | G08G 1/143 340/932.2 |
| 2014/0345811 | A1 | * | 11/2014 | McDaniel | E06B 9/24 160/188 |
| 2015/0279130 | A1 | * | 10/2015 | Robertson | H04L 63/0876 340/5.61 |
| 2017/0073912 | A1 | * | 3/2017 | Marabyan | E01F 13/06 |

FOREIGN PATENT DOCUMENTS

| | | |
|---|---|---|
| DE | 102013113172 | 5/2015 |
| EP | 0603884 | 6/1994 |
| WO | 2010020831 | 2/2010 |

\* cited by examiner

# PARKING GARAGE FOR MOTOR VEHICLES, IN PARTICULAR MULTISTORY PARKING GARAGE, AND METHOD FOR MANUFACTURING A PARKING GARAGE

CROSS REFERENCE TO RELATED APPLICATIONS

This application claims the benefit of, and incorporates by reference in its entirety, European Patent Application No. 16152225.5, filed on Jan. 21, 2016.

DESCRIPTION

The invention relates to a parking garage for motor vehicles, in particular a multistory garage, comprising a ground floor level and at least one parking floor level located above the ground floor level.

In particular in urban or city centers, the availability of parking spaces for motor vehicles, especially motor vehicles, is often tight. Apart from development plans, the reason for this also includes the high property values, which only make using such areas for purposes of building parking garages or multistory parking garages become profitable starting at a specific minimum capacity of the parking garage. For this reason, there is a lack of parking spaces for motor vehicles, and not just for visitors to city centers, but also for residents who live or work in or near city centers. Precisely these individuals are often unable to find an affordable parking space.

PRIOR ART

Known from U.S. Pat. No. 5,049,022 A is a multistory parking structure that can be modularly erected, and whose components can be transported. Provided here is an automated motor vehicle parking system, in which a motor vehicle driver leaves the motor vehicle after driving into an entrance area of the parking structure, after which a computer takes over further control. The motor vehicle is parked in a parking shelf process on support elements that are spaced apart from each other.

DE 101 39 948 A1 discloses a multistory building with a drivable conveyor for transporting motor vehicles between several floor levels. Several floor levels here each comprises at least one parking space for a motor vehicle, and several floor levels that comprise a parking space have at least one respective area with a residential, business or similar use.

A two-story or multistory collective garage is described in DE 24 27 113 A1.

However, parking solutions known from prior art cannot provide parking spaces for an open user group, given the integration of parking spaces in residential or other non-residential buildings, and the associated customization work.

Furthermore, parking solutions known from prior art also do not allow optimal use of the space available for parking places, while simultaneously ensuring that the motor vehicle owner has unlimited access to his or her own motor vehicle.

DESCRIPTION OF THE INVENTION: OBJECT, SOLUTION, ADVANTAGES

The object of the invention is to provide a parking garage for motor vehicles, in particular a multistory garage, comprising a ground floor level and at least one parking floor level located above the ground floor level, which can be easily, quickly and cost-effectively erected, and makes efficient use of limited space, in particular in urban centers.

The object is achieved according to the invention by providing a parking garage for motor vehicles, in particular a multistory garage, comprising a ground floor level and at least one parking floor level located above the ground floor level, a support structure with a shaft, at least one conveyor for the essentially vertical transport of motor vehicles, wherein the at least one parking floor level comprises at least one parking space for at least one motor vehicle, wherein the parking garage is designed for transferring a motor vehicle between the conveyor and a parking position on the at least one parking space, the transfer being powered by the motor vehicle itself, wherein a first side of at least one of the parking floor levels is arranged on the support structure.

Arranging a parking floor level above a ground floor level advantageously makes optimal use of the space available in city centers. The ground floor level can here be designed in such a way as to access or enter the parking garage via the ground floor level, in particular exclusively. Further provided is a support structure, which stabilizes the parking garage. Providing a conveyor for the essentially vertical transport of motor vehicles makes it possible to transport motor vehicles, for example motor vehicles such as passenger cars or motorcycles, from the ground floor level to the at least one parking floor level or between parking floor levels, thereby eliminating the necessity for space-consuming ramps between the parking floor levels or between the ground floor level and the at least one parking floor level for conveying motor vehicles.

The invention additionally provides that the parking garage be designed for transferring a motor vehicle between the conveyor and a parking position on the at least one parking place, the transfer being powered by the motor vehicle itself. In other words, in particular an automated transport or transfer of a motor vehicle between the conveyor and parking place is not provided. A motor vehicle is hence transferred or transported by the motor vehicle driver and/or, given an autonomously driving motor vehicle, by the control device of the motor vehicle designed for this purpose. On the one hand, eliminating an automated parking system provides a cost-effective parking garage, since expensive control systems and the mechanical equipment required for transferring the motor vehicle between the conveyor and parking place, such as cranes, conveying carriages or the like, are not required. In addition, this avoids potential safety risks posed to individuals present in the parking garage or multistory garage from the operation of automated systems. In particular, doing without full automation basically allows individuals, such as motor vehicle drivers, to freely move around in the parking garage, enabling unrestricted access to their own motor vehicles.

In the sense of the invention, a self-powered motor vehicle transfer is to be construed as meaning that the motor vehicle is moved between the conveyor and parking place using the engine power of the motor vehicle, for example the power of an internal combustion engine or the power of an electric motor, which is not part of the parking garage. In particular, the motor vehicle driver personally or singlehandedly drives the motor vehicle from the conveyor to the parking place, and possibly back again.

In addition, it can best be provided that a motor vehicle also be transferred from outside, i.e., from the environment surrounding the parking garage or from city traffic, into the conveyor, or from the conveyor to the outside, the transfer being powered by the motor vehicle itself. In particular, this means that the motor vehicle is preferably moved or transferred from city traffic into the conveyor or moved or transferred from the conveyor into city traffic by the motor vehicle driver or, given an autonomously driving motor vehicle, by the corresponding control device and control software of the motor vehicle.

It is preferably provided that at least one side of the at least one parking floor level located on the support structure be suspended from the support structure, or hooked or inserted into a corresponding receiving device. A first side of the at least one parking floor level can also be integrated into the support structure. In other words, the first side of the parking floor level comprises part of the support structure in this case.

It is further preferably provided that the at least one parking floor level with a second side of the parking floor level preferably lying opposite the first side of the parking floor level rests on preferably vertically aligned support elements, in particular column elements, or be joined with support elements, in particular column elements.

It is especially preferred that a first parking floor level be located above the ground floor level. A first side of the first parking floor level is arranged on the support structure, in particular suspended or hung from the latter. A second side of the parking floor level lying opposite the first side rests on support elements, preferably on column elements. The support or column elements join the ground floor level with the at least one parking floor level, i.e., the support or column elements are joined with the ground or foundation of the parking garage at a first lower end, and with the parking floor level, preferably with the lower side of the parking floor level, at a second end lying opposite the first end. One, two or more, preferably four, support or column elements can be located at each of the at least one parking floor level.

The support or column elements are preferably designed to absorb, bear or dampen loads and oscillations produced by the changing weight and force distribution in the parking garage. This means that the support or column elements are preferably not designed to absorb a majority of the weight and all of the forces acting on the parking garage. In other words, when the parking garage is not in use, i.e., given a parking garage in which there are no motor vehicles or individuals, the column elements only divert a small portion of the weight and other forces acting on the parking garage into the foundation or into the ground. When a parking garage is not in use, the second side of the at least one parking floor level essentially rests on the column elements, without placing a heavy load on the support or column elements.

When the parking garage is in use, i.e., for example, when a motor vehicle is parked in the parking place of the at least one parking floor level, or when a motor vehicle is being transferred between the conveyor and parking place, or when individuals are present in the parking garage, in particular on the parking floor level, or move around on the latter, these conditions and activities trigger an altered distribution of forces on the at least one parking floor level, and potentially also trigger vibrations or oscillations on the at least one parking floor level. The support or column elements then preferably serve to intercept the altered distribution of forces or vibrations or oscillations, or divert them into the ground or foundation of the parking garage.

However, it is also possible for the support or column elements to absorb, bear or divert more than just a small portion, but preferably at most half, especially preferably at most 30%, very especially preferably at most 15%, of the entire weight and/or all forces acting on the parking garage.

If several parking floor levels are preferably provided, wherein at least two parking floor levels are located vertically one above the other, support or column elements can also be arranged between the parking floor levels located one above the other. It is then especially preferred that the support or column elements upon which the bottom one of the parking floor levels located one above the other be arranged below the support or column elements as viewed in a vertical direction, which extend between the lower parking floor level and the parking floor level located above the latter. It is very especially preferred that the support or column elements located one above the other form an essentially uninterrupted or continuous column, which preferably reaches from the ground or foundation of the parking garage up to the roof or up to a roof element of the parking garage, wherein the essentially uninterrupted or continuous column is potentially interrupted only by the at least one parking floor level, or wherein the at least one parking floor level combines with a partial area to form a part or section of the essentially continuous column.

It can be provided that one side of at least one of the parking floor levels be located on the support structure in a protruding manner. It is especially preferred that the at least one parking floor level be designed as a protruding floor. The protruding arrangement of at least one parking floor level on the support structure allows the base area of the parking garage to be as small as possible on the ground or a foundation, without taking into account overhangs. In particular, the protruding areas of the parking floor level are not counted as part of the base area in this approach, so that the base area of the parking garage essentially corresponds to the floor area of the support structure. The floor area of the support structure can here essentially correspond to the area required by the conveyor. As a result of this minimized base area of the parking garage on the ground or foundation, the space freed in particular below the lowermost parking floor level can be used as another parking space and/or as an entrance and/or exit for the parking garage. In addition, the minimized base area makes it possible to eliminate more extensive civil engineering work, and to easily and cost-effectively seal the ground floor level of the parking garage, or eliminate the necessity of sealing the ground floor level of the parking garage.

Further, it is also possible for a first side of a first area or section of the at least one parking floor level to be located on the support structure in a protruding manner, while a second side of a second area or section of the at least one parking floor level preferably lying opposite the first side rests on support or column elements.

Several parking floor levels can preferably also be provided, wherein it is further preferred that a first side of the several parking floor levels, in particular all parking floor levels, be arranged on the support structure on a first side and/or on a second side and/or on several or all sides, in particular exterior sides, of the support structure. A second side of the additional parking floor levels can rest on support or column elements. If several parking floor levels are located one above the other, the support or column elements located one above the other, upon which the respective parking floor levels located one above the other rest, yield an essentially continuous column from the ground or foundation of the parking garage until the roof of the parking garage. However, it can also be provided that the additional parking floor levels be arranged on the support structure in a protruding manner. Combinations of parking floor levels that protrude and parking floor levels that rest on support or column elements are also conceivable.

Two or more conveyors can preferably also be provided, wherein it is further provided that the two and/or the several, especially preferably all, conveyors be located in and/or on the support structure and/or in a shaft of the support structure.

Further, the at least one parking floor level can preferably comprise two or more parking spaces. Several, in particular all, parking floor levels can also comprise at least one, preferably two or more, parking spaces.

It can preferably also be provided that at least one parking place be provided on the ground floor level of the parking garage. This results in another optimized space utilization.

In addition, it can preferably also be provided that the parking garage comprise not only parking floor levels above the ground floor level, but further that there also be at least one parking floor level below the ground floor level, i.e., at least one parking floor level erected in the ground area during a civil engineering process.

The provision of parking floor levels arranged below the earth's surface can further optimize the utilization of the building site provided for the parking garage.

It is further preferred that several parking floor levels also be arranged above the ground floor level, in particular all parking floor levels.

According to the present invention, the formulation of an essentially vertical transport also comprises transport movements that take place at an angle to the vertical, for example at an angle of up to 45° to the vertical. However, it is especially preferably provided that the deviation in transport direction from the vertical lies in the single digit degree range, or that the deviation from the vertical measures at most one degree.

It is preferably provided that the parking garage be a prefabricated building.

This means that the parking garage be erected in a prefabrication process. In the prefabrication process, use is made of prefabricated elements, for example which are part of the support structure or parking floor levels, the parking places or the conveyor. This eliminates the need for a complicated adjustment of the parts and elements required for erecting the parking garage at the erection site. In addition, a standardization of the parking garage can be achieved with the prefabrication process. Standardization lowers the costs, and reduces the construction or erection time for the parking garage. Furthermore, standardizing the components in the prefabrication process also makes it possible to determine maximum dimensions for these components, so that the necessary parts can also be delivered to difficultly accessible locations and there assembled.

It is especially preferably provided that the conveyor be designed to transport motor vehicles and individuals with or without a motor vehicle.

It is here especially advantageous for the conveyor to be designed to also transport individuals without a motor vehicle. An individual, for example a motor vehicle driver or motor vehicle owner, can thus move his or her motor vehicle over the ground floor level in the conveyor, the transfer being powered by the motor vehicle itself. The motor vehicle with the motor vehicle driver is subsequently lifted or lowered from the ground floor level to a parking floor level. The motor vehicle driver thereupon drives or guides his or her motor vehicle from the conveyor, and moves it into a parking position on the at least one parking place of the parking floor level. The motor vehicle driver can then exit his or her motor vehicle, close or lock it, and then be returned from the parking floor level to the ground floor level again by the conveyor, without having to provide additional transport means or transport paths for this purpose.

The costs for the parking structure can be further reduced by doing without additional specialized conveyors or conveyors provided especially for individuals, such as passenger elevators.

It is further preferably provided that the support structure be designed to absorb the majority, especially preferably essentially the entire, weight of the parking garage and all forces acting on the parking garage, wherein the support structure is in particular centrally arranged in the parking garage.

If the support structure is designed to essentially absorb the entire weight of the parking garage and all forces acting on the parking garage, this means in particular that the forces acting on the parking floor level, for example the weight of the parking floor level itself or of motor vehicles situated on the parking floor level, are conveyed to the support structure via the junction between the parking floor level and support structure, and from there to the ground or foundation. In other words, it is preferred that the support structure be the static element of the parking garage that is connected with the ground or foundation of the parking garage, and diverts a majority of the weight and forces acting on the parking garage into the ground.

It is further especially preferred that the support structure comprise an essentially rectangular or square base or ground area. The at least one parking floor level is then arranged on a first exterior side of the support structure, above the ground floor level. Additional parking floor levels can be located above the first parking floor level in a vertical direction, and one side of them is likewise arranged on the support structure. While the additional parking floor levels can be arranged on the support structure in a protruding manner, a second side of the additional parking floor levels can also rest or abut or be supported on column or support elements. It is especially preferred that parking floor levels also be arranged on a second exterior side of the support structure lying opposite the first exterior side of the support structure, preferably at the same height as the parking floor levels on the first exterior side of the support structure. It can also be provided that parking floor levels be provided on the support structure at three or even at all four exterior sides of the parking structure. Depending on how the parking floor levels are arranged on the support structure, varying space concepts can be implemented, or an optimized utilization of the available space can be achieved.

It is especially preferred that the parking floor levels be arranged at precisely two opposite exterior sides of the support structure, which essentially has a rectangular base or ground area. This results in a parking garage that is essentially oblong in a first expansion direction or longitudinal direction, whereas it instead comprises rather narrow dimensions in a transverse direction perpendicular to this longitudinal direction. This oblong configuration of the parking garage makes it possible to integrate the parking garage into many of the narrow properties present in urban centers.

It is further especially preferred that the entries or entrances to the conveyor, for example a parking garage entrance, be located on the same exterior side or same exterior sides of the support structure on which the parking floor levels arranged on the support structure are also situated. This means that the motor vehicle driver can drive his or her motor vehicle forward into the conveyor, that the motor vehicle is then transported by the conveyor from the ground floor level to a parking floor level, and that the motor vehicle driver then drives his or her motor vehicle backwards or forwards onto a parking place of the parking floor level, depending on whether the parking floor level is located on the exterior side of the entrance or entry to the conveyor or on the exterior side of the support structure lying opposite this exterior side. Arranging the entrances or entries and the at least one parking floor level in this way relative to each other eliminates the need for complicated maneuvering processes for aligning the motor vehicle, for example on the parking floor level.

In principle, however, it is also possible for the entrance or entry to the conveyor, for example a parking garage entrance, to be located on an exterior side of the support structure other than the exterior side on which the parking floor level is arranged. In such a case, it can be advantageous that the conveyor be designed to align the motor vehicle accordingly, so that the motor vehicle driver can comfortably and easily move it from the conveyor in a self-powered manner into a parking position on the at least one parking place of the at least one parking floor level, and park it there.

In particular, a parking garage entrance on the ground floor level can be located on a first exterior side of the support structure. In addition, a second parking garage entrance can be located on a second exterior side of the support structure, in particular one lying opposite the first exterior side. If the second parking garage entrance lies on the second exterior side opposite the first exterior side, it can also serve as a parking garage exit and vice versa. In particular, it is preferred that a motor vehicle driver be able to drive his or her motor vehicle into the conveyor via the first parking garage entrance, and, when leaving the parking garage, for example after leaving the at least one parking floor level with the motor vehicle, to leave the conveyor via the second parking garage entrance or parking garage exit. This means that the conveyor can comprise an entrance or exit for both the first and the second parking garage entrance or parking garage exit. When the conveyor is cleared for entry, for example when the gates of the conveyor are open, it becomes possible to drive from the parking garage entrance through the conveyor to the parking garage exit. This eliminates the need for turning maneuvers.

The central arrangement of the support structure in the parking garage enables an optimal introduction of forces into the ground or into the foundation of the parking garage, as well as an optimal distribution of weight for the entire parking garage structure. In particular, the support structure is centrally arranged when the latter is situated roughly centrally in a longitudinal direction and/or centrally in a transverse direction perpendicular to the longitudinal direction of the parking garage, with the parking garage being viewed from above.

Another preferred embodiment provides that the support structure of the parking garage be a support column with a shaft for the conveyor, and that the conveyor be situated in the shaft of the support column.

As a result of this preferred configuration, the support structure performs two jobs at once. On the one hand, it provides support and absorbs the forces, in particular essentially the entire weight, of the parking garage. On the other hand, the conveyor can be situated in the shaft of the support structure. This yields a space-saving and also cost-effective configuration of the parking garage.

It can further preferably be provided that the conveyor be an elevator system designed to transport motor vehicles and individuals, preferably a lift or elevator, especially preferably a rope traction elevator.

These types of elevator systems, lifts, elevators or traction elevators are reliable, save on space, and are inexpensive to assemble, install and use. In addition, these types of conveyors require a base area, which roughly corresponds to the base area of the support structure, thus making it especially suitable to be situated in a shaft of the support structure.

However, it is also possible for the conveyor to be a lifting platform or some other device suitable for transporting motor vehicles and/or individuals. The conveyor designed as an elevator system, in particular as a rope traction elevator, is designed to transport motor vehicles and individuals, even without a motor vehicle, so that individuals can be moved between the different parking floor levels and ground floor level by means of the elevator system without taking along a motor vehicle. In particular, this makes it possible for individuals to enter the parking garage without a motor vehicle, be conveyed to a specific parking floor level by the conveyor, for example the elevator system, transfer their motor vehicle in the conveyor, the transfer being powered by the motor vehicle, be conveyed together with their motor vehicle back to the ground floor level by the conveyor or elevator system, and finally exit the parking garage with the motor vehicle.

It is further preferably provided that the at least one parking floor level exhibits at least one floor element, wherein the at least one floor element forms at least one part of the parking place of the at least one parking floor level.

It is here especially preferably provided that the at least one floor element, in particular all floor elements, be an essentially massive structure, i.e., one that comprises no holes and/or openings and/or cavities. However, cavities can be provided if they serve to economize on weight. Providing at least one floor element yields a parking place or at least a portion of the parking place, on which the motor vehicle driver can park his or her motor vehicle. If the floor element forms only a portion of the parking place, additional floor elements can be provided and arranged next to each other, so as to provide an entire or complete parking place.

The at least one floor element can here comprise at least one parking floor level. The at least one floor element preferably forms a portion of the parking floor level, i.e., the at least one parking floor level comprises several floor elements, or is composed of the latter.

The at least one parking floor level preferably comprises two, three, four or more floor elements, which are arranged next to each other to form the parking floor level. It is especially preferable that the floor elements of a parking floor level be aligned parallel to each other, and each extend away from the support structure, starting from the support structure. A first side of the floor elements is here located on the support structure. It is especially preferred that a second side of the floor elements that preferably lies opposite the first side be placed or rest on support or column elements.

The at least one parking floor level can also be essentially identical to the floor element. A first side of the floor element, which then comprises in particular the parking floor level, can be arranged on the support structure, in particular suspended or hung from the latter. It is further preferably provided that the second side of the at least one floor element, which preferably lies opposite the first side, be lying, resting or supported on a support or column element.

When erecting the parking garage, a portion of the support structure can initially be built or erected. One side of the at least one parking floor level, preferably the at least one floor element, can then be arranged on the support structure, for example by suspending it from the latter or integrating the first side of the at least one parking floor level into the support structure. In the next step, the process of erecting the support structure can then be continued. This approach enables a modular construction that corresponds to the prefabrication process.

In addition, the at least one floor element can comprise at least one reinforcement, which imparts stability to the floor element. The floor element then preferably has a smaller thickness between the reinforcements than at the location of the reinforcements. The reinforcements can be girders or girder sections, which are integrated into the at least one floor element and/or comprise part of the floor element. The reinforcements, in particular the girders, can be used to divert the weight of the at least one parking floor level into the support structure. To this end, the at least one floor element can be connected to the support structure via the reinforcement, in particular the girders. In particular, the at least one floor element especially preferably comprises reinforced concrete. The structure of the at least one floor element then takes the form of at least one girder, in particular one reinforced concrete girder or steel girder, which is integrated into the floor element as reinforcement. The floor element and girder preferably comprise a structural unit, which can be manufactured in a prefabrication process.

One side of the at least one floor element can be joined or arranged on the support structure by means of the ends of the floor element girder located there. If a second side of the at least one floor rests on support or column elements, it is especially preferably provided that a section of the reinforcement of the floor element, in particular an area of the floor element containing the girder, rest on the support or column element. In the area where the at least one floor element rests on a support or column element, the girder can be directly connected with the support or column element, or arranged or joined to the latter.

It can further also be provided that at least one girder, in particular one cantilever, be fastened to the support structure in a protruding manner, wherein the at least one floor element, preferably all floor elements, is/are arranged on the at least one girder, in particular on the cantilever.

It can here also be provided that the at least one floor element, which preferably forms the parking floor level or a portion of the parking floor level, be arranged with one side on the at least one girder, in particular the cantilever, while lying, resting or supported on support or column elements with a second area thereof.

One end of the girder, in particular the cantilever, preferably facing away from the support structure, can also be resting or supported on support or column elements. In such a case, it is preferably provided that the at least one floor element not rest on support or column elements, but rather that only the girder rests on support or column elements.

Various girders can be present or used in the parking garage. For example, girders can be provided in the construction of the support structure. However, cantilevers can preferably also be provided, which are fastened to the support structure in a protruding manner. As a result of the protruding arrangement of the cantilevers on the support structure, the free ends of the cantilevers yield receiving areas, on which the at least one floor element can be arranged. Given the use of cantilevers or girders, the at least one parking floor level advantageously does not have to be arranged on the support structure in a protruding manner in its entirety or in a single piece. Rather, girders or cantilevers can advantageously be provided on the support structure while erecting the parking garage. Only after at least a portion of the support structure and the cantilever fastened to the support structure have been erected can the at least one floor element then be arranged on the girder or cantilever. This enables a modular construction that complies with the prefabrication process and is especially inexpensive. In particular, more than one girder or cantilever can be provided. For example, two, three or four or more girders or cantilevers can be provided for each parking floor level, which is located on an exterior side of the support structure, wherein the floor elements are then placed or arranged on a respective two, three, four or more adjacent cantilevers. This yields a stable and cost-effective construction. In addition, individual floor elements can be changed out in the event of damage, so that a parking floor level damaged by environmental influences or wear need only be partially replaced, specifically only the part that sustains the damage.

It is further preferably provided that the girder, in particular the cantilever, be a sectional beam, preferably a sectional beam with a T-profile or a double T-profile or an I-profile, while the girder, in particular the cantilever, is especially preferably a reinforced concrete girder or a steel girder.

It is especially preferred that the girder, in particular the cantilever, not be a steel girder.

The use of sectional beams is especially advantageous, since sectional beams are especially stable in relation to forces acting perpendicular to their longitudinal direction. For this reason, they are especially suited for bearing the weight of the parking floor level, in particular of the floor elements of the parking floor level, and transfer it into the support structure via the area where the cantilevers are fastened to the support structure, whereupon the support structure diverts the forces, in particular the weight, of the parking garage and the forces bearing down on the parking garage into the foundation or soil or ground. It is here especially advantageous to provide T-profile, double T-profile or I-profile girders, since the latter comprise an especially suitable stability for purposes of the parking garage. The use of reinforced concrete girders is also especially advantageous, since the latter can be manufactured in great numbers, and are especially stable, weather resistant and also cost effective. Reinforced concrete components, in particular reinforced concrete girders, are also especially advantageous from the standpoint of fire safety. However, steel girders can be provided if changing fire safety requirements so permit.

It is further preferably provided that the floor element be a base plate, wherein the base plate preferably comprises reinforced concrete or consists of reinforced concrete.

If the at least one parking floor level is comprised of the floor element, then the at least one parking floor level is also designed as a base plate, which preferably comprises reinforced concrete or consists of reinforced concrete.

In particular, designing the floor element as a base plate ensures that the floor element comprises no holes or openings or the like. By contrast, cavities can be provided to reduce weight. In addition, a plate generally comprises large proportions in two dimensions, wherein the proportions of the plate as a rule are comparatively small in a third dimension perpendicular to the two dimensions. This provides an especially flat, and thus weight-saving, floor element. The base plates comprise the kind of dimensions that preferably allow them to be arranged on at least two adjacent cantilevers or girders of the support structure. It is especially expedient to use reinforced concrete in the base plates or concrete slabs consisting of reinforced concrete, since reinforced concrete is especially stable at a comparatively low weight, and thus especially suitable for purposes of the parking garage, i.e., for absorbing the weight of motor vehicles. In addition, reinforced concrete slabs are easy to manufacture and obtain in a standardized form. As a consequence, using reinforced concrete for the base plates or using base plates that comprise reinforced concrete in particular facilitates the way that the parking garage is constructed or erected in a prefabrication process.

The at least one base plate can additionally comprise at least one reinforcement, which imparts stability to the base plate. The base plate is then preferably designed with a smaller thickness between the reinforcements than at the location of the reinforcements. The reinforcements can be girders or girder sections that are integrated into the at least one base plate and/or comprise part of the base plate.

It is further preferably provided that the support structure comprise at least one shaft wall element, wherein the at least one shaft wall element preferably comprises reinforced concrete or consists of reinforced concrete.

Just as with the floor elements designed as base plates, using shaft wall elements for the support structure yields the advantages of a cost-effective erection process for the parking garage via prefabrication. In addition, using shaft wall elements for the support structure results in a simplified construction method, since a support structure with essentially a rectangular or square base or floor area can be quickly and cost-effectively erected using in particular prefabricated and/or standardized shaft wall elements. Power and/or water supply lines are preferably also to be provided while erecting the parking garage. A support structure comprised of shaft wall elements is stable, weather resistant and can be erected within the shortest time.

Preferably provided for the supply lines, in particular for the power supply line, are standardized harnesses, which are especially preferably arranged in a niche or recess in the shaft wall elements. Using standardized harnesses makes it easy to maintain and erect the parking garage, and enables a reduction in construction costs. Parking garage development basically does not envisage a water supply line. However, it is possible for the parking garage to comprise a sprinkler or irrigation system. In such a case, standardized water supply lines can also be provided.

In an especially preferred embodiment, it is provided that the support structure comprise at least one U-portal and/or E-portal, which preferably comprises reinforced concrete, wherein the U-portal and/or E-portal especially preferably comprises a concrete cover with a thickness of at least 5 cm, which has steel elements of the reinforced concrete.

The U-portals and/or E-portals can best be used on the at least one parking floor level and/or on the ground floor level to border or reinforce or stabilize an entrance or exit of the conveyor to the parking floor level and/or city traffic.

The steel elements of the reinforced concrete used for the U-portals and/or E-portals are preferably covered by a layer of concrete having a thickness of at least 5 cm. This yields U-portals and/or E-portals that are stable and in particular weatherproof, or resistant to the forces acting upon them.

Further preferably provided is at least one façade element, preferably several façade elements, wherein the façade element is preferably transparent or partially transparent in design, wherein the façade element is especially preferably arranged on the exterior side of the parking garage.

The façade elements can here enclose all sides of the at least one parking floor level, preferably all parking floor levels, possibly with the exception of the first side of the parking floor level, which is arranged on the support structure, possibly in a protruding manner.

The façade elements preferably extend over the entire height of the parking garage or over the entire height of the individual respective parking floor levels, and thus preferably comprise a height corresponding to the distance between one parking floor level and the parking floor level located above the latter.

In particular, the façade elements can here be fastened only to a top parking floor level or parking garage roof and a bottom parking floor level, and thus extend between the top parking floor level or parking garage roof and the bottom parking floor level. It can also be provided that the façade element be interrupted and divided into several façade elements, wherein the individual façade elements each only extend between a first parking floor level and a second parking floor level lying directly above the latter.

The façade elements preferably serve as a safeguard for the at least one parking floor level, thereby protecting individuals located in particular on a higher parking floor level against falling off of the parking floor level. Providing transparent or partially transparent façade elements on the one hand allows daylight to fall on the parking floor levels, so that additional lighting for the parking floor levels need not be provided, at least during the day. This makes it possible to reduce the costs for power, and hence maintenance and operation, of the parking garage.

The use of transparent or partially transparent façade elements further makes it possible to view the parking floor levels from outside of the parking garage.

In addition, the façade elements can also be suitable for the attachment of advertising spaces or other information carriers in the form of posters or films or the like. In particular, the façade elements can be designed as printed films, or at least comprise printed films in partial areas or comprise printed films.

In particular, advertising elements can be hung from the outside of the façade elements.

The at least one façade element further preferably comprises at least one layer of wire mesh, wherein the façade element preferably comprises precisely one layer of wire mesh. However, two or more layers of wire mesh can also be provided.

The open structure achieved in particular by the wire mesh also provides natural ventilation for the parking garage, thereby eliminating the need for other fixtures for ventilating and airing out the parking garage, in particular in the event of fire. The parking garage is thus not a closed building in terms of fire safety. Nevertheless, the façade elements lower the sound pressure level from the parking garage, and enable a dimming of light sources in the parking garage, in particular in the evening. The especially advantageous characteristics of the parking garage with regard to fire safety preferably also eliminate the need for a sprinkler system or the like.

Wire mesh is lightweight and inexpensive, easy to manufacture and can be attached to the outside of the parking garage in a simple manner. In addition, wire mesh can best be delivered or obtained as roll or yard stock, thereby ensuring that the parking garage can be easily manufactured or erected.

In addition, wire mesh, whether in one or two layers, is stable enough to withstand even collisions with motor vehicles moving on the parking floor levels, thereby also protecting or securing motor vehicles against falling from one of the parking floor levels. The one layer of wire mesh or two layers of wire mesh can further preferably be provided with open loops or a closed loop, or given an open-loop or closed-loop design.

It is especially preferred that the façade elements, in particular the wire mesh façade elements, be arranged on the exterior side or on the façade of the parking garage by means of angular elements and clamping elements. In particular, the façade elements can here be fastened to only a top parking floor level, or to a parking garage roof, and to a bottom parking floor level, and thus only be fixed in a top and bottom area of the parking garage.

The individual façade elements, for example the façade elements comprised of wire mesh, here preferably span the gap between a floor element of a parking floor level and a floor element of a second parking floor level located above this parking floor level or a roof of the parking garage. Provided for attaching the wire mesh are brackets, in particular brackets made out of metal or steel, which are secured to the floor elements or cantilevers of the parking floor levels, e.g., by means of screws.

It can further also be preferred that the façade elements span the entire exterior side of the parking garage, while only being fastened or clamped in the upper area of the parking garage, for example to a roof element, and in the lower area of the parking garage, for example at the bottom one of the at least one parking floor level. The wire mesh is then preferably clamped on the floor elements or cantilevers of the parking floor levels.

It is further preferably provided that the at least one parking floor level comprises impact protection fixture.

Providing an impact protection fixture, which is located behind the at least one parking place of the at least one parking floor level as viewed from the direction of the support structure, can prevent a motor vehicle from coming too close to the edge of the at least one parking floor level, for example while in reverse or driving on the at least one parking floor level, in the worst case scenario smashing through the façade element. As a consequence, the impact protection fixture limits the freedom of movement for motor vehicles to the at least one parking floor level, thereby minimizing the potential danger posed by vehicular movement.

The at least one impact protection fixture further serves to separate the at least one parking place away from escape routes, such as a staircase, so that the latter also remain clear in case of emergency, even if motor vehicles are parked in the parking place.

It can further be preferred that lighting elements, in particular LED lamps, be arranged on the wire mesh, in particular between the at least two layers of wire mesh, so as to illuminate the parking garage.

Lighting elements can also be arranged so as to enable their use to illuminate or light the exterior side of the parking garage from below, i.e., from the ground floor level or respective floor level of the at least one parking floor level, in particular with colors.

The arrangement of lighting elements provides a cost-effective option for the outwardly directed illumination, in particular all-round lighting, of the parking floor levels. In addition, this ensures that observers outside of the parking garage will have an aesthetic view of the parking garage. In particular, the LED lamps can have or emit different colors. In addition, the lighting elements, in particular the LED lamps, can be situated between the wire mesh layers in such a way as to yield an aesthetically attractive lighting pattern or an image, such as a light sculpture. While the lighting elements can be arranged between at least two layers of wire mesh, it is preferably provided that the lighting elements be fastened to a façade element having only a single layer of wire mesh. In addition, lighting elements, in particular LED elements, can to this end also be used on other possible façade elements. If two wire mesh layers are provided, the second layer preferably only serves to protect LED elements that might be fastened in and/or on the first layer of wire mesh.

When the lighting elements, in particular the LED lamps, are correspondingly arranged on the façade elements of the parking garage, the lighting elements, in particular the LED lamps, produce an oversized screen, which casts light outward and creates a large, dynamic advertising column in the cityscape at a distance of preferably up to 100 m. Advertising spaces can be produced by arranging lighting elements on an exterior side of the parking garage, and creating an oversized screen with the lighting elements. This makes it possible to generate additional advertising revenue.

Transparent or partially transparent façade elements are especially advantageous. By contrast, if the façade elements are not transparent or partially transparent, the lighting elements, in particular the LED lamps, can ensure that the parking floor levels are illuminated or provide an aesthetically appealing outward appearance of the parking garage, depending on how they are arranged on the interior or exterior side of the façade elements.

It is advantageously further preferably provided that a stair structure, in particular a staircase, be arranged on the parking floor level, in particular on the side of the at least one parking floor level facing away from the support structure, which connects the parking floor level with the ground floor level and/or with other parking floor levels.

Stair structures can also be provided on several, preferably on all parking floor levels.

The provision of a stair structure, preferably consisting of stair elements, or of a staircase opens up escape routes, which ensure that the parking garage can be used or that the parking garage can be evacuated in case of a fire or some other dangerous situation, even when the conveyor, in particular the elevator system, cannot be used. For this reason, the stair structure, in particular the staircase, is preferably located on the side of the at least one parking floor level facing away from the support structure, since this side of the parking floor level is farthest away from the support structure and the conveyor, in particular the elevator system. As a consequence, if a fire breaks out in the conveyor, users of the parking garage, in particular motor vehicle drivers, can safely exit the parking garage via the stair structure, in particular the staircase, located at the end of the parking floor level.

The stair structure or staircase is especially preferably also lined with façade elements, wherein the façade elements can be transparent or partially transparent. It can especially preferably be provided that the façade elements, which envelop the sides of the parking floor levels open to the surrounding environment, in particular the three sides that are not the sides of the parking floor levels arranged on the support structure, also envelop the stair structure and/or staircase, or be located on the latter.

Additional façade elements can further be provided between the stair structure, in particular the staircase, and the parking floor level. Using façade elements that are preferably transparent or partially transparent for the stair structure and/or staircase creates a stair structure flooded by light or a staircase flooded by light, which beyond that creates an airy and light impression. In addition, façade elements made out of wire mesh or comprising wire mesh are lightweight. This is advantageous in particular when the support structure as the sole load-bearing element is designed to absorb essentially the entire weight of the parking garage and all forces acting on the parking garage, and when the stair structure or staircase is simultaneously located on the side of the at least one parking floor level facing away from the support structure.

In such a case, it is expedient and advantageous that the staircase or stair structure be comparatively lightweight in design so as to avoid the leverage effect. Using wire mesh as the façade element is especially advantageous, since the latter is very lightweight.

Another advantage to the stair structure or staircase is that individuals can enter the individual parking floor levels independently of the conveyor. In particular when the traffic inside of the parking garage is brisk, i.e., when several individuals or motor vehicle drivers with their motor vehicles wish to enter or exit the parking garage, the conveyor may intermittently be operating at capacity. It is then advantageous here that individuals can also enter or exit the parking garage via the stair structure or staircase.

It can further preferably be provided that at least one parking floor level, in particular several, especially preferably all parking floor levels, comprise a charging station, in particular an electric charging pole for charging an accumulator of an electrically driven motor vehicle.

The use of electrically driven motor vehicles is suitable in particular in urban areas. For this reason, owners of such a motor vehicle can park their motor vehicle in the parking garage while visiting the city or overnight, and use the charging pole, in particular the electric charging pole, for charging the accumulator of their motor vehicle.

However, other charging stations can also be provided. For example, it is possible to provide a hydrogen fueling station or a natural gas and/or gasoline fueling station, so that motor vehicles with a hydrogen, natural gas or gasoline engine can also be fueled.

It is especially preferably provided that the at least one parking floor level, in particular several, especially preferably all parking floor levels, comprise a locker and/or an accessible area.

Parking garage users can rent the locker or accessible area. As a consequence, for example, parking garage users who have parked their motor vehicle in the parking garage can use the locker or the accessible area to temporarily store their purchases. In addition, it is also possible that the locker, which in particular is assigned to a parking place, be a kind of packing station in the parking garage. This means that parking garage users can order products in stores or online, and then have them delivered to the packing station, so that they are made ready for pickup by the parking garage user.

It can especially preferably be provided that the parking garage comprises a personalized access control device, which in particular comprises a camera and/or barrier, wherein the access control device is preferably designed to give an individual with access authorization access to the parking garage and/or to at least one parking floor level upon successful identification.

However, the personalized access control device can also comprise a gate or similar or otherwise suitable means. It is especially expediently further provided that a control system be provided for controlling the access control device, for example the camera, barrier or gate.

A camera, preferably a video camera, is preferably part of the access control device. The camera and an in particular computer-implemented software can be used for license plate acquisition, and thus to recognize motor vehicle license plates. Matching the recognized or acquired (motor vehicle) registration number with entries on a stored list of access-authorized individuals and license plates assigned to these individuals makes it possible to verify the access authorization of individuals or authorization of individuals to use the parking garage with their motor vehicles.

Preferably provided is a booking system, which following a license plate acquisition is designed to assign in particular a parking place-related booking to an individual.

The booking system preferably comprises a booking server, and is designed in particular for exchanging data with the access control device. Connecting the booking system with an access control device makes it possible to allocate an in particular parking place-related booking to an individual, for example to a motor vehicle driver, following a license plate acquisition or recognition. A booking is to be understood as the use or rental of a parking place on one of the parking floor levels.

So-called "fixed users", for example residents, can use or book a parking place at fixed times, for example overnight. To this end, the corresponding user need only drive his or her motor vehicle into the parking garage. The camera, in particular the video camera, of the access control device recognizes and identifies the license plate of the motor vehicle, and allocates it to the user via the booking system. The user specifies his or her bank data and preferred booking periods beforehand, for example by way of an online application platform. The booking system checks whether the user has booked or reserved a parking place for the given time or period. If so, the access control device opens access to the parking garage.

If the user is leaving the parking garage with his or her motor vehicle, the camera of the access control device can possibly acquire and identify the license plate of the motor vehicle once again. The time at which the parking garage is exited can be stored in the booking system. This makes it possible to draw up an invoice or booking accurate to the minute or half hour. In addition, invoicing to the exact minute enables an especially cost-efficient use of the limited resource "parking place" or "parking space".

It can further be provided that a fixed user be guaranteed that a capacity will be present at a specific time, or that a parking place can be allocated to the fixed user at the specific time. It is here possible that the allocated parking place in each use be one that differs from the previous parking place.

One example for a possible use can be as follows: A fixed user parks in the parking garage from 10 p.m. to 8 a.m. Another fixed user, for example an employee whose workplace is near the parking garage, uses the same parking place from 8:30 a.m. to 5 p.m. The parking space is then made available to so-called event users, for example moviegoers or diners, from 5 p.m. until 10 p.m. As a consequence, a mix of fixed and demand-driven use is here involved. However, a strictly demand-driven use can also be provided. It can also be possible that the parking places of the parking garage, in particular the use of the parking places, be monitored and managed by a computer system or booking system, thereby ensuring an optimal utilization of the parking places. In addition, non-fixed users, for example users who only wish to use the parking garage one time or as needed, can acquire the authorization to use the parking garage preferably by taking a parking ticket from a packing meter of the parking garage. Furthermore, computer terminals can also be provided, at which first users or non-fixed users can apply and register to use the parking garage by storing at least their contact data, bank data and, if necessary, motor vehicle license plate number.

The access control device preferably comprises a camera, and can be arranged on the individual, preferably on all, parking floor levels. The access control device can also be located at the entrance or entry to the parking garage, in particular on the ground floor, at the entrance to the conveyor and/or at the entrances and exits of the staircase or stair structure to the ground floor level and/or the parking floor levels.

The access control device or system for access control is most preferably designed so that an access-authorized individual identifies him- or herself at the access control device. It is best that such an identification take place automatically by acquiring or recognizing the motor vehicle license plate with a camera of the access control device, and comparing the motor vehicle license plate with a database in a booking system. However, identification can also take place, for example, by way of a key, a radio signal, e.g., one transmitted via a radio signal transponder, a magnetic card on a magnetic card reader, a fingerprint sensor, a retina scanner, or using a mobile telephone application.

In particular, it can here be provided that the access-authorized individual be identified by a booking or control system located at the parking garage site, whereas the data can also be compared by means of a control device remote from the parking garage, for example a central EDP device of a parking garage operator.

Access control devices can thus be located at the entrance and/or exit of the parking floor levels. Access control devices can also be provided at the entrance and/or exit of the staircase or stair structure.

Another preferred embodiment provides that cladding elements, in particular evergreen or greened elements, be arranged on the support structure and/or façade.

The use of such elements ensures an aesthetic exterior or interior design of the parking garage. Since the elements do not have to be arranged over the entire surface of the façade and/or support structure, the latter can also be secured to these two elements in patterns or structures. Having the cladding elements be designed as evergreen or greened elements makes it possible in particular to achieve a positive effect on the climate on the parking floor levels. It can here also be provided that evergreen or greened elements be located on the parking floor levels, for example on the stair structure or on the floor elements of the parking floor levels.

The parking garage especially preferably has a width of between 5 m and 20 m, preferably of between 7 m and 12 m, especially preferably of 10 m. It can further be preferred that the parking garage has a length of between 10 m and 40 m, preferably of between 20 m and 30 m, especially preferably of 24 m.

The preferred dimensions make the parking garage especially suitable for use as an inner city parking garage, in particular as a multistory garage. The preferred dimensions are selected in such a way as to be able to fit the parking garage into the gaps between buildings that are usually encountered in urban centers. In addition, the claimed dimensions make it especially easy to achieve a division of parking floor levels adapted to the intended application for a parking place of a motor vehicle.

Another preferred embodiment provides that the parking floor levels, in particular the distance between an upper side of a parking floor level and the upper side of the parking floor level lying above the latter measures between 2.50 m and 3 m, preferably 2.75 m. At these distances between the parking floor levels, an optimal space utilization is achieved, which makes it possible to move and park even larger motor vehicles in the parking garage, such as SUV's. In addition, individuals or motor vehicle drivers can move freely on the parking floor levels.

If girders or in particular cantilevers are provided, the thickness of the girders or cantilevers as viewed in the vertical direction preferably measures at most 100 cm, especially preferably at most 70 cm, particularly preferably 70 cm, so that preferably a minimal clearance of 2.05 m is provided between the individual parking floor levels.

The parking garage is preferably suitable for passenger cars, in particular up to the size of off-road motor vehicles or luxury limousines. It is especially preferably provided that the parking garage not be suitable for motor vehicles or trucks, for example starting at a total weight of 3.5 tons.

It can further preferably be provided that between 5 and 15, preferably between 7 and 10, very especially preferably 8 parking floor levels be present on a respective first and/or second exterior side of the support structure. The overall height of the parking garage preferably measures between 15 m and 40 m, further preferably between 20 m and 30 m, especially preferably 25 m to 26 m. This preferred number of parking floor levels as well as the preferred heights are especially suitable for parking garages that are inserted between the already existing building façades in inner-city centers.

A parking floor level can preferably have a length of between 5 m and 15 m, preferably of between 8 m and 10 m, especially preferably of 9 m. If the parking floor level only comprises one floor element or the one floor element forms the parking floor level, the specified dimensions also apply to the floor element that is designed as a base plate, for example, and especially preferably comprises or exhibits reinforced concrete.

If several floor elements are provided for a parking floor level, i.e., if the at least one parking floor level comprises several floor elements, the length of the floor elements, in particular of the floor elements designed as base plates, can preferably measure between 3 m and 5 m, especially preferably between 3.50 m and 4 m, and very especially preferably 3.70. The width of the floor elements can measure between 1 m and 3 m, especially preferably between 1.40 m and 2 m, and very especially preferably 1.50 m.

Depending on the provided dimensions of the parking floor level and floor elements, the floor elements or base plates can be arranged longitudinally or transversely, in particular at a right angle, to the longitudinal direction of the parking floor level. The distance between two preferably adjacent cantilevers or girders then in particular measures roughly the length or width of the floor elements or base plates, so that the floor elements can be placed on the cantilevers, and bridge the free space between the cantilevers or girders.

The at least one parking place especially preferably has a width of between 2.50 m and 4.50 m, further preferably of between 3 m and 4 m, and especially preferably of 3.50 m. In addition, the at least one parking place preferably has a length of between 4 m and 6 m, further preferably of between 4.50 m and 5.50 m, and especially preferably of 5 m.

It can be provided that the dimensions of the parking place conform to DIN Standard 18040-3 regarding the dimensions of automobile parking places.

Accordingly, the dimensions selected for the parking floor level must then be sufficiently generous to allow the latter to comprise at least one, preferably two, in particular adjacent parking places. Furthermore, the parking floor levels can be dimensioned in such a way as to provide enough space for escape routes and access paths in addition to the parking places.

The preferred proportions and dimensions yield an open area on the individual parking floor levels.

The parking garage is preferably designed in such a way as to ensure barrier-free access, and in particular be suitable for families, the elderly and the handicapped. The preferred proportions offer enough space to set up or unfold a stroller or wheelchair on the at least one parking floor level, for example, even if the parking place of the parking floor level is occupied by a motor vehicle. The generous dimensions of the parking place or the at least one parking floor level further reduce the danger of parking garage users being hit or injured by motor vehicles.

It can preferably be provided that the ground floor level have a floor seal. It is further preferred that the floor seal be designed to allow seepage, so that rainwater can seep through the floor seal and drain off. It is further preferred that a drainage system be provided under the floor seal.

A circumferential staircase can especially preferably be provided, wherein the circumferential staircase is arranged on at least three exterior sides of the parking garage.

A utility room can further preferably be provided, which preferably is located on the ground floor near and/or on the support structure. The utility room can preferably house equipment used to supply power and/or control the technical facilities of the parking garage.

It is further preferably provided that the parking garage comprises a modular structure, wherein the at least one shaft wall element and/or the at least one cantilever and/or the at least one girder and/or the at least one floor element and/or the at least one U-portal and/or the at least one stair element are preferably prefabricated.

The use of prefabricated elements and components allows for prefabrication, which can also be referred to as modular construction. This ensures a simple, cost-effective and fast way of building the parking garage.

Another solution to the object underlying the invention has to do with providing a method for manufacturing a parking garage, in particular a multistory garage, which comprises the following steps:
   a) Placing or laying a foundation,
   b) Placing a central support column on the foundation via prefabrication, wherein the support column comprises shaft wall elements made out of reinforced concrete, which form a shaft of the support column,
   c) Placing at least one parking floor level on the support column with a first side of the parking floor level, wherein the at least one parking floor level comprises at least one parking space for motor vehicles,
   d) Placing an elevator system in the shaft of the support column for the essentially perpendicular transport of motor vehicles and individuals,
   e) Placing façade elements, preferably composed of wire mesh, wherein the façade elements are fastened to the exterior side of the parking garage.

The method according to the invention provides an especially simple and cost-effective method for manufacturing or erecting a parking garage. The use of shaft wall elements made out of reinforced steel makes it possible to build the parking garage via prefabrication, wherein the shaft wall elements especially preferably simultaneously comprise or encompass the support column and a shaft arranged inside of the support column. The shaft of the support column incorporates an elevator system. Simultaneously using the support column as the element that bears the parking garage and as a receiving chamber for an elevator system results in a parking garage that is cost-effective to manufacture or erect. This also makes the method for manufacturing a parking garage less expensive.

It can further be provided that support or column elements be arranged on a second side of the at least one parking floor level, which preferably lies opposite the first side of the parking floor level, wherein the parking floor level is especially preferably rested, placed or situated on the support or column elements with the second side of the parking floor level.

It can also be provided that the at least one parking floor level comprises at least one floor element, wherein the floor element especially preferably comprises at least one girder, which very especially preferably is integrated into the floor element. The step of placing at least one parking floor level then preferably comprises the step of placing at least one floor element, wherein the floor element is joined or situated on the support column via the girder integrated into the floor element.

The at least one parking floor level preferably comprises reinforced concrete or consists of reinforced concrete. It can also be preferably provided that the step of placing at least one parking floor level comprise the step of placing two or more parking floor levels on the support column.

Procedural step b) can preferably also comprise the step of placing cantilevers, in particular comprising reinforced concrete, on the support column.

The method can preferably also comprise the step of placing base plates made out of reinforced concrete on the girders.

This simplifies the modular or prefabrication or finished part method for erecting or manufacturing the parking garage.

It is further preferably provided that the method for manufacturing the parking garage comprise the step of placing base plates made out of reinforced concrete on the cantilevers to provide at least two parking floor levels, wherein the two parking floor levels are located on opposite exterior sides of the support column, wherein the support column especially preferably comprises a rectangular or square base or ground area.

It is further preferable that the method for manufacturing a parking garage additionally comprise the step of placing a stair structure, in particular a staircase, on the at least one parking floor level, wherein the stair structure is especially preferably located on the side of the at least one parking floor level facing away from the support column.

It can further preferably be provided that the method for erecting or manufacturing a parking garage envisage the step of placing in particular evergreen or greened plate elements on the support column or on the façade or on the exterior side of the parking garage.

BRIEF DESCRIPTION OF THE DRAWINGS

Exemplary embodiments of the invention are depicted on FIGS. 1 to 10. Shown on.

DETAILED DESCRIPTION OF THE DRAWINGS

Figure 1:
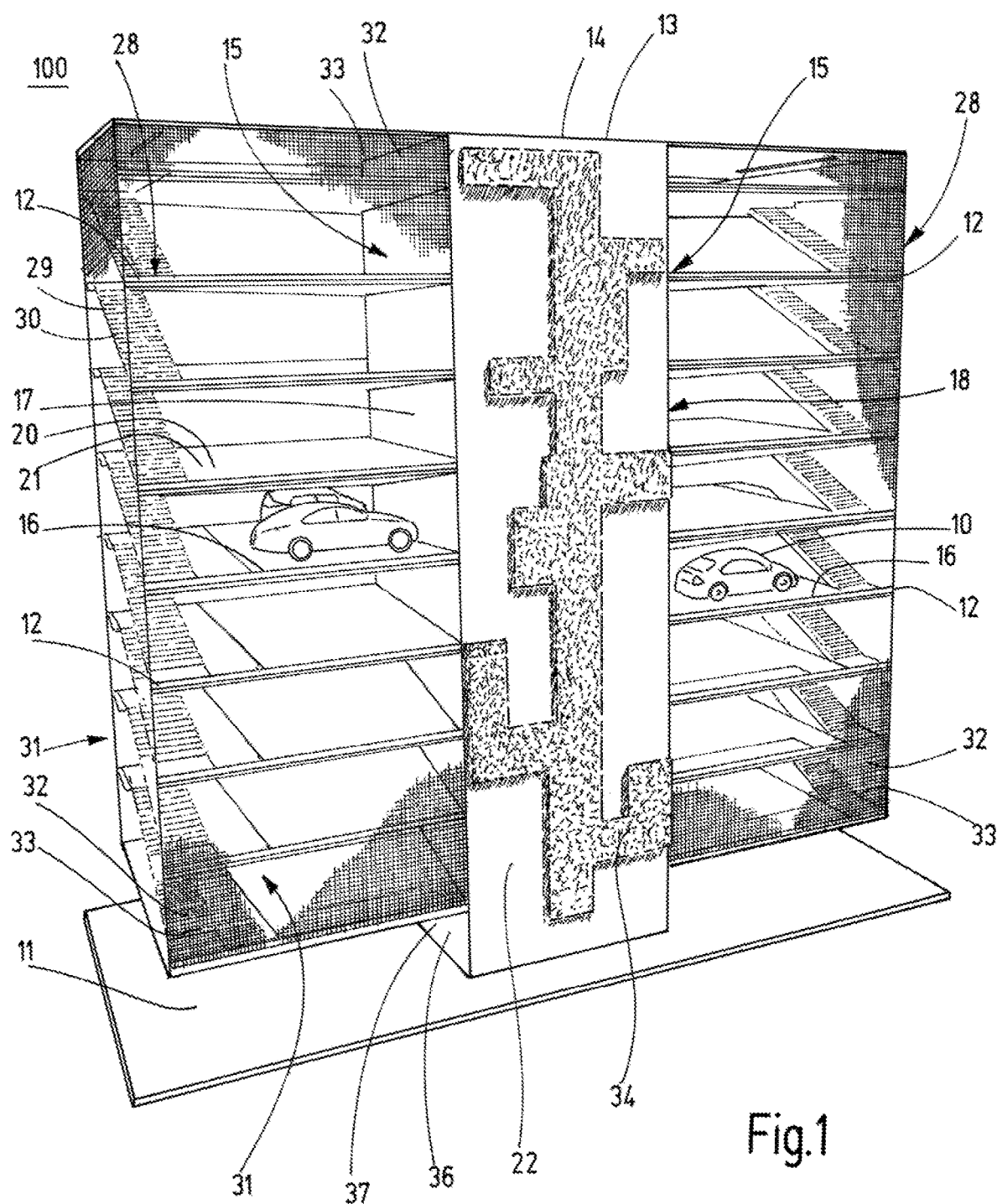
FIG. 1 is a perspective view of a parking garage with a support structure and several parking floor levels.
Figure 2:
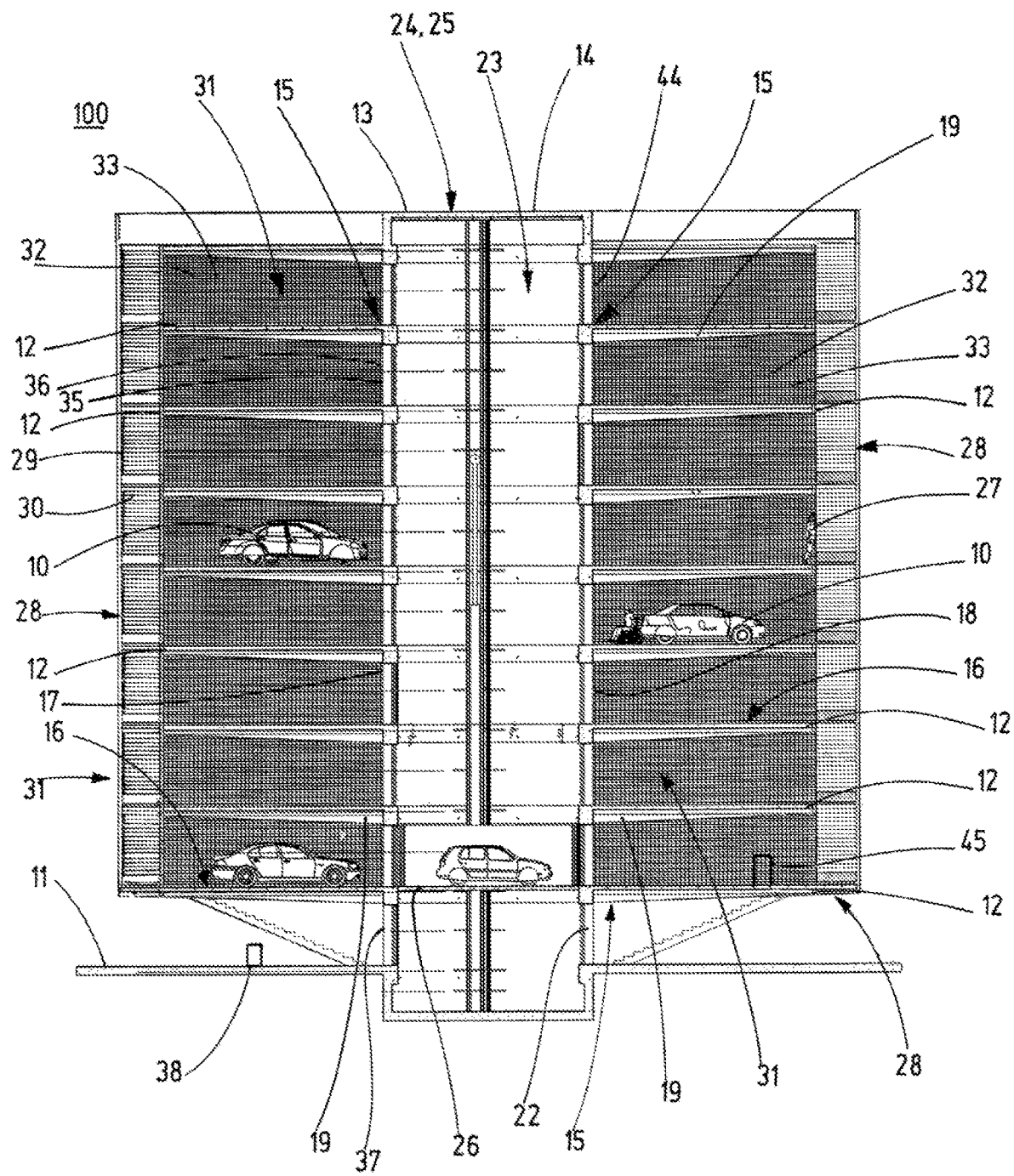
FIG. 2 is a side view of the parking garage with a support structure and several parking floor levels.

FIGS. 1 and 2 present a perspective view and side view of a parking garage 100 for motor vehicles 10. The parking garage 100 comprises a ground floor level 11 as well as a total of 16 parking floor levels 12. The parking garage 100 further comprises a support structure 14 designed as a central support column 13. A first side 15 of the individual parking floor levels 12 is fastened to the support column 13 in a protruding manner. The parking floor levels 12 comprise parking places 16. The parking floor levels 12 are fastened to a first exterior side 17 of the support structure as well as to a second exterior side 18 of the support structure 14 lying opposite the first exterior side 17. Each parking floor level 12 comprises two parking spaces.

The side view on FIG. 2 of the parking garage 100 reveals how the individual parking floor levels 12 are arranged on the support structure 14 in a protruding manner. To this end, cantilevers 19 made out of reinforced concrete are fastened to the support structure 14 in a protruding manner. Floor elements 21 designed as base plates 20 are situated on the cantilevers 19 in such a way that the floor elements 21 are borne by the cantilevers 19. In addition, the individual floor elements 21 comprise the parking places 16 or at least portions of the parking places 16. The support structure 14 designed as a support column 13 is assembled out of shaft wall elements 22 (FIG. 1), wherein the shaft wall elements 22 are made out of reinforced concrete. The floor elements 21 designed as base plates 20 are also made out of reinforced concrete. The shaft wall elements 22 of the support column 13 comprise a shaft 23, which incorporates a conveyor 25 designed as a rope traction elevator 24 for the vertical transport of motor vehicles 10. The rope traction elevator 24 here comprises an elevator cabin 26, which is designed to convey or transport motor vehicles 10 or individuals 27.

As shown on FIGS. 1 and 2, a stair structure 30 designed as a staircase 29 is located on the second side 28 of the parking floor level 12 facing away from the support structure 14.

The three free sides 31 of the respective parking floor levels 12 are covered by façade elements 32. The façade elements 32 comprise a wire mesh 33. The wire mesh is only denoted on FIG. 1. The façade elements 32 are arranged on the three free sides 31 of the parking floor level 12. In addition, a façade element 32 is also located between the stair structure 30 and area of the parking floor level 12.

Evergreen or greened plate elements 34 are arranged on the exterior of the shaft wall elements 22, creating an aesthetically appealing appearance of the parking garage 100.

At the height of each parking floor level 12, the support column 13 comprises an entrance or exit 35, through which an individual 27 or a motor vehicle driver can move his or her motor vehicle 10 out of the elevator cabin 26 of the rope traction elevator 24 onto the parking floor level 12.

The entrance or exit 35 of the elevator cabin 26 or rope traction elevator 24 can be secured with a respective gate 36 or barrier.

Figure 3:
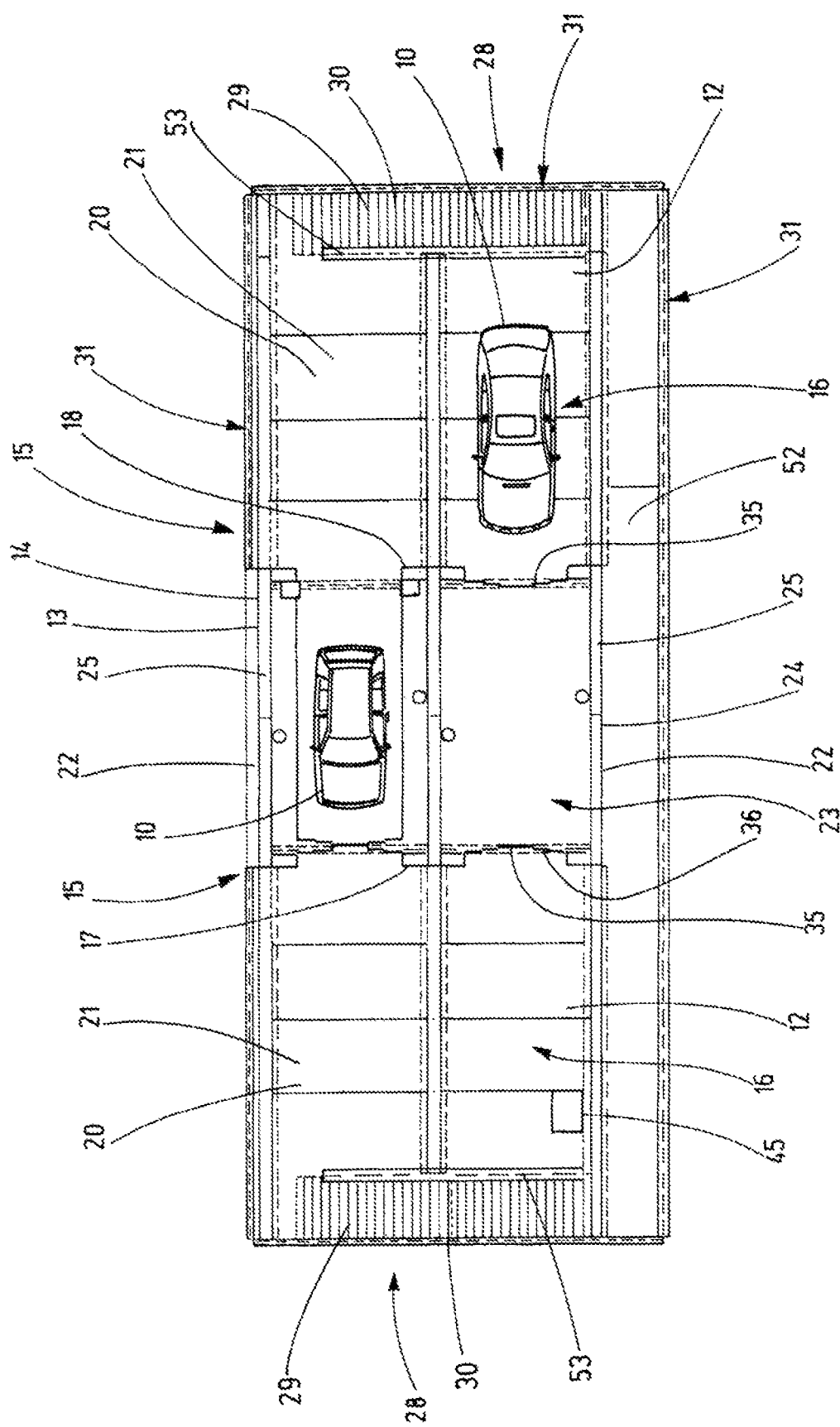
FIG. 3 is a top view of a parking floor level of a parking garage with four parking spaces.

FIG. 3 presents a top view of a parking floor level 12 of the parking garage 100. The parking floor levels 12 are located in a protruding manner on opposing first and second exterior sides 17, 18 of the support column 13. Cantilevers 19 are provided for this purpose. To provide a parking place 16, floor elements 21 designed as base plates 20 are placed on the cantilevers 19 transverse to the longitudinal direction of the parking garage 100. The floor elements 21 comprise reinforced concrete or are made out of reinforced concrete. A staircase 29 is located on a second side 28 of the parking floor level 12 facing away from the support column 13, via which motor vehicle drivers or individuals 27 can leave the parking garage 100 in the event of a fire without having to use the rope traction elevator 24. The rope traction elevator 24 comprises an elevator cabin 26 that is suitable for transporting motor vehicles 10. In the embodiment shown, two elevator cabins 26 are provided, which are located next to each other in a shaft 23 of the support column 13.

The use of the parking garage 100 will now be explained drawing reference to FIG. 2.

Powered by the motor vehicle 10, a driver (not shown) drives the motor vehicle 10 on the parking floor level 11 to the support column 13. A parking garage entrance 37 and access control device 38 are located on the ground floor level 11. The access control device 38 can comprise a camera, in particular a video camera. The video camera potentially along with a computer-implemented process are used to recognize the license plates of the motor vehicles driving in and allocate them by way of a database to a booking or an individual authorized to access the parking garage 100. A booking system preferably comprising a booking server can be provided for booking allocation. Once the license plate has been successfully identified, the gate 36 of the parking garage entrance 37 is opened, and the motor vehicle driver moves the motor vehicle 10 into the elevator cabin 26 of the rope traction elevator 24, the transfer being powered by the motor vehicle 10 itself.

After selecting the desired parking floor level 12, which can also be done automatically by identifying the authorized individual, the motor vehicle 10 along with the motor vehicle driver are transported in a vertical direction to the desired parking floor level 12. After the elevator cabin 26 has come to a stop, the gate 36 of the corresponding parking floor level 12 is opened. The motor vehicle driver now transfers or moves his or her motor vehicle 10, the transfer being powered by the latter from the elevator cabin 26 of the rope traction elevator 24 to the parking place 16 of the parking floor level 12. Depending on whether the motor vehicle driver is authorized to access the parking floor level 12 on the first exterior side 17 of the support column 13 or on the second exterior side 18 of the support column 13, a front or rear gate 36 of the elevator cabin 26 opens, and the motor vehicle driver moves his or her motor vehicle 10 from the elevator cabin to the parking place 16, in drive or in reverse.

After the motor vehicle driver has parked his or her motor vehicle 10 in the parking space 16 and locked it, he or she leaves the parking garage 100 either by way of the staircase 29 located at the end side of the parking floor level 12 or the rope traction elevator 24.

As shown on FIG. 2, the parking floor levels 12 or parking places 16 are generously designed, so that the parking floor levels 12 still have enough space for setting up personalized lockers or rooms (not depicted here).

Lighting elements and/or advertising elements (not depicted here) can here further be fastened to the façade elements 32.

Figure 4:
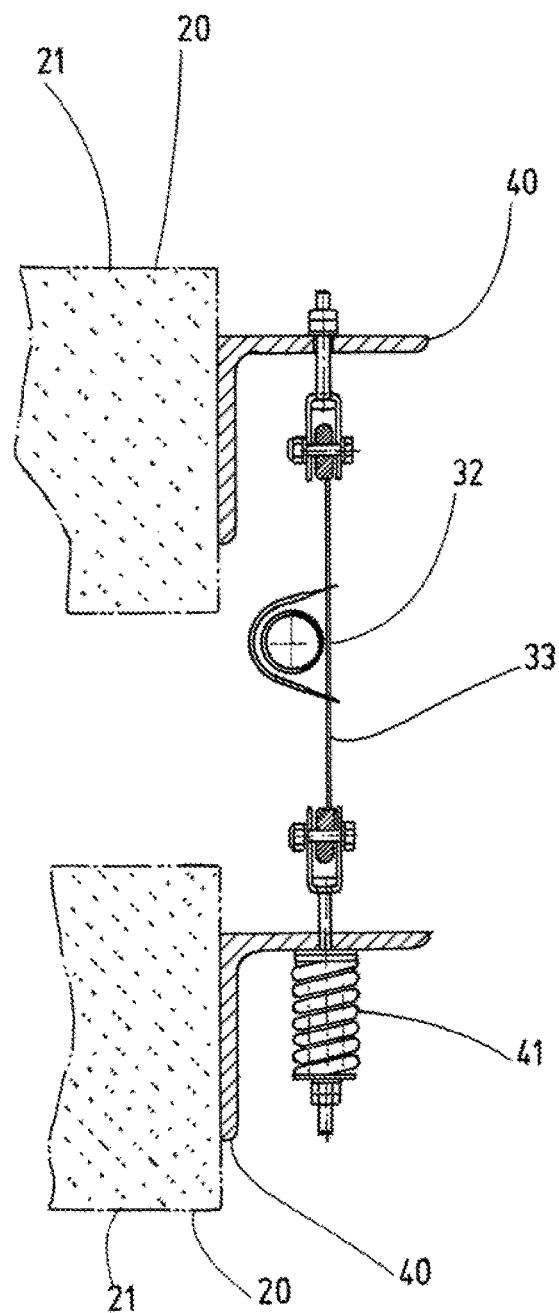
FIG. 4 is a fastening device for the façade elements consisting of wire mesh, FIG. 5 are two embodiments for a wire mesh façade element.

FIG. 4 shows a fastening device 39 for fastening the façade elements 32 to the parking floor levels 12. In order to fasten the façade elements 32, brackets 40 are secured to the floor elements 21, for example by means of screws. The façade element 32 is clamped between two brackets 40, which each are fastened to floor elements 21 located one over the other in a vertical direction.

In order to ensure a resilient and flexible façade element 32, a spring element 41 is provided, which pre-stresses the façade element 32 between the two brackets 40.

Figure 5:
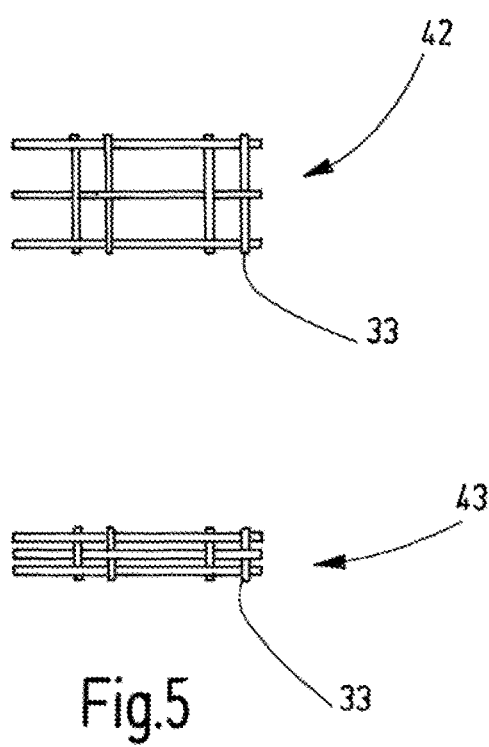

FIG. 5 presents two examples for configuring a wire mesh 33 of the façade element 32. The wire mesh 33 can be designed with open loops 42 or closed loops 43.

It can further be provided that the façade element 32 be assembled out of two different wire meshes 33, namely a wire mesh 33 with open loops 42 and a wire mesh 33 with closed loops 43.

Provided to reinforce the entry or exit 35 to the parking floor levels 12 or reinforce the parking garage entrance 37 are E-portals 44, which comprise a concrete cover of at least 5 cm for the reinforced concrete parts used for the U-portals 44.

Figure 6:
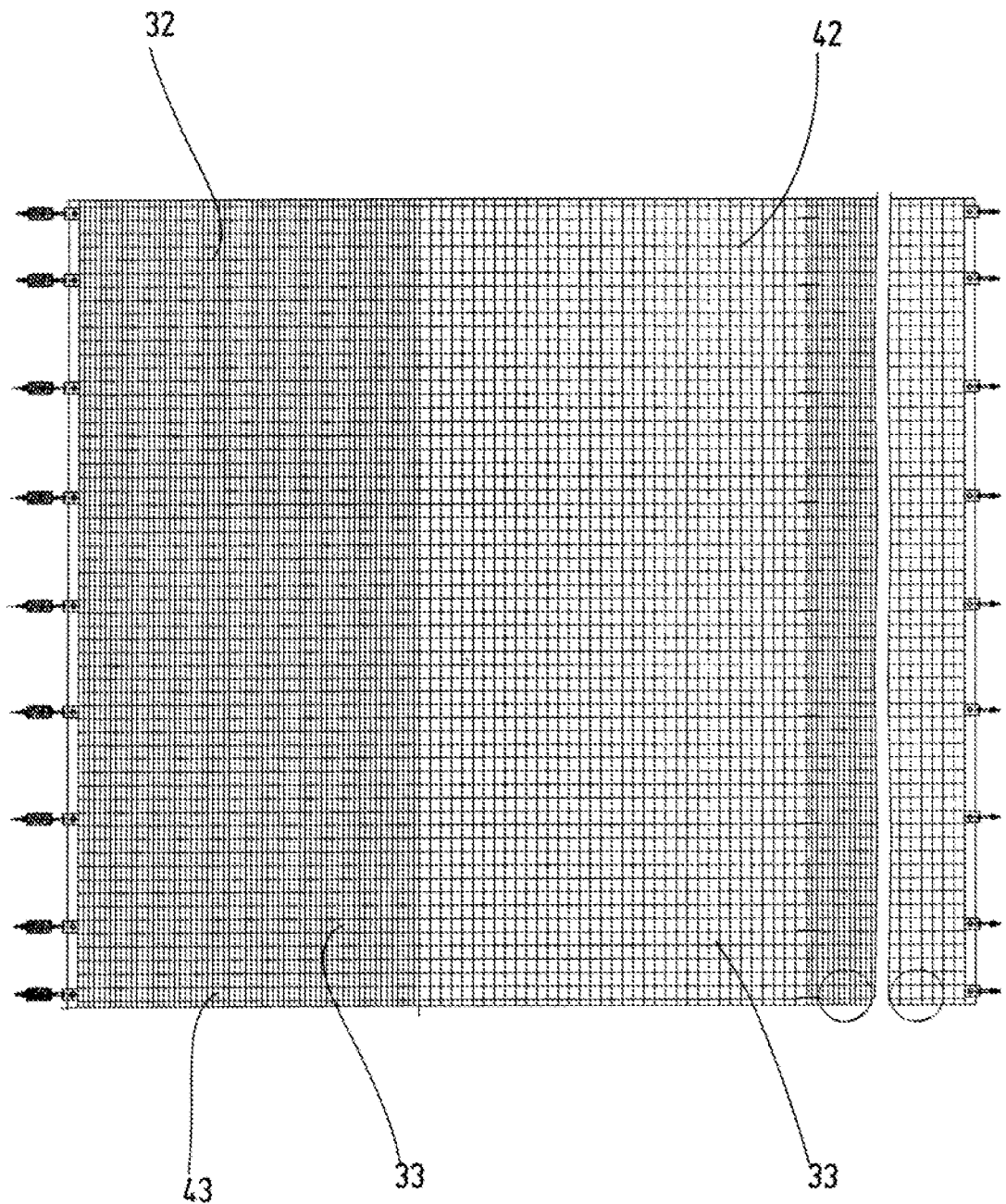
FIG. 6 is a section of a façade element.

FIG. 6 shows a section of a façade element 32, which alternatingly comprises a wire mesh 33 with open loops 42 and a wire mesh with closed loops 43.

On FIGS. 2 and 3, a charging station 45, in particular an electric charging pole for charging an accumulator of an electrically drivable motor vehicle 10, is located on one of the parking floor levels 12.

Figure 7:
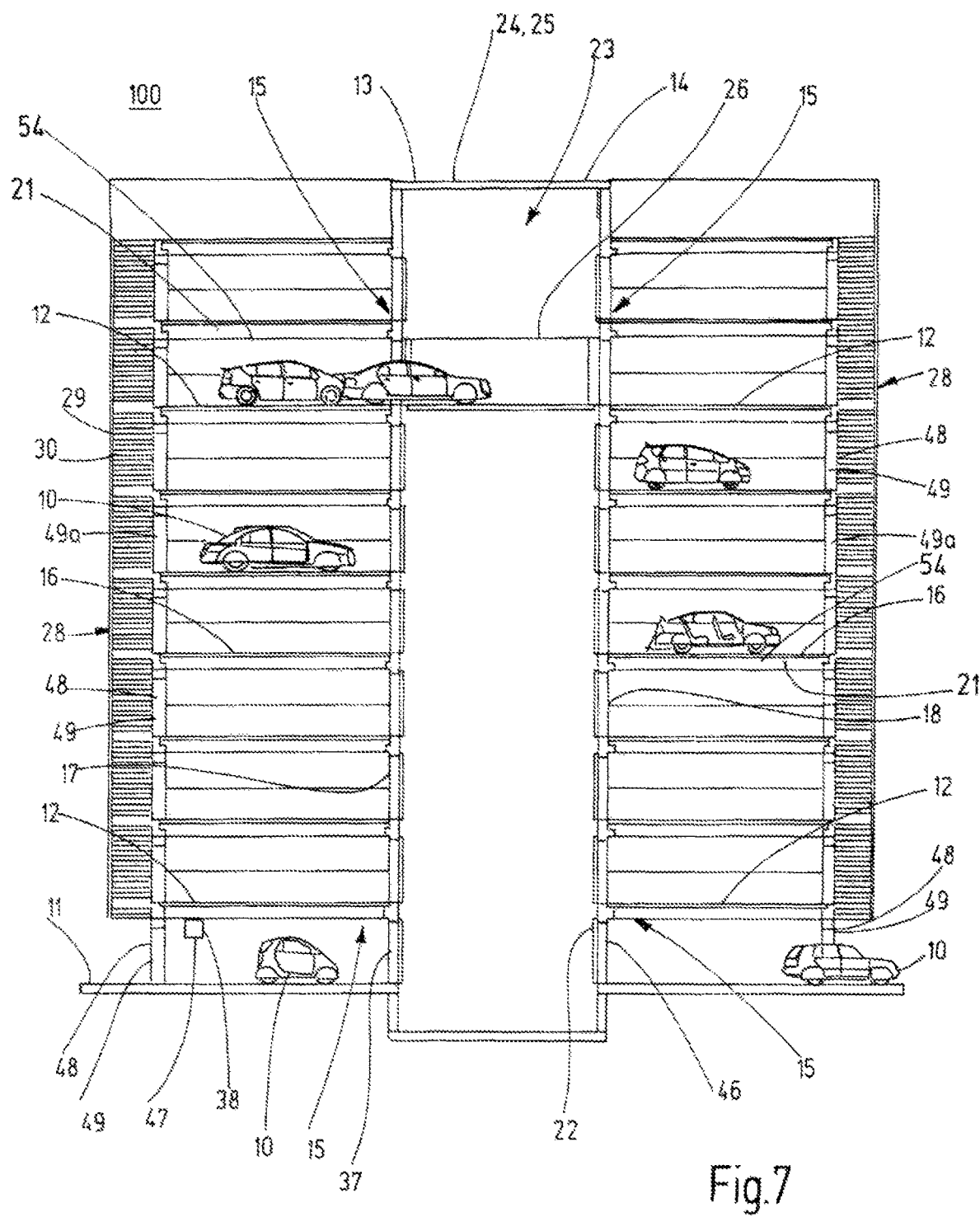
FIG. 7 is a side view of another parking garage with a support structure and several parking floor levels.

FIG. 7 shows another embodiment of the parking garage 100. The parking garage 100 comprises a ground floor level 11 as well as parking floor levels 12, a first side 15 of which is arranged on a support structure 14 designed as a support column 13. As opposed to the parking garage 100 on FIG. 2, the parking floor levels 12 are not placed on cantilevers, but their first side 15 is instead situated directly on the support column 13. To this end, the parking floor levels 12 comprise floor elements 21, which integrate girders 54. The floor elements 21, and hence the parking floor levels 12, are arranged on or joined with the support column 13 by way of the girders 54. Located on a second side 28 lying opposite the first side 15 are support elements 48 respectively designed as column elements 49, upon which the second sides 28 of the parking floor levels 12 are placed. For this purpose, the support point of the parking floor levels 12 on the column elements 49 takes the form of a section of the girder 54 integrated into the floor elements 21. On the one hand, the girders 54 thus rest on the column elements 49. On the other hand, the girders 54 are also situated on the support column. As a consequence, the girders transfer the forces and vibrations acting on the floor elements to the support column 13, and to less of an extent to the column elements 49. The column elements 49 are arranged one above the other viewed in a vertical direction, so that they can divert an altered load or force distribution or vibrations arising in the parking floor levels 12 into the ground floor level 11. In other words, a majority of the overall weight of the parking garage 100 and forces acting on the parking garage 100 are diverted to the ground floor level 11 and the ground. Motor vehicles 10 driving on the parking floor levels 12 or individuals moving on the parking floor levels 12 give rise to force imbalances and vibrations. These are transferred via the girders 54 integrated into the floor elements 21 to the column elements 49, which absorb and divert the latter. The column elements 49 consist of an essentially continuous column 49a from the ground floor level 11 up to the roof of the parking garage 100. The parking garage 100 on FIG. 7 here also comprises façade elements 32 not depicted here. A camera 47 of an access control device 38 is fastened to the underside of a lower parking floor level 12. The camera 47 can be used to detect and recognize the license plates of motor vehicles 10. After the detection, the motor vehicles can be allocated to a motor vehicle owner by means of a booking system. A parking garage entrance 37 and parking garage exit 46 are provided on the ground floor level 11.

In addition, the parking garage 100 on FIG. 7 essentially corresponds to the parking garage 100 shown on FIGS. 1 and 2.

Figure 8:
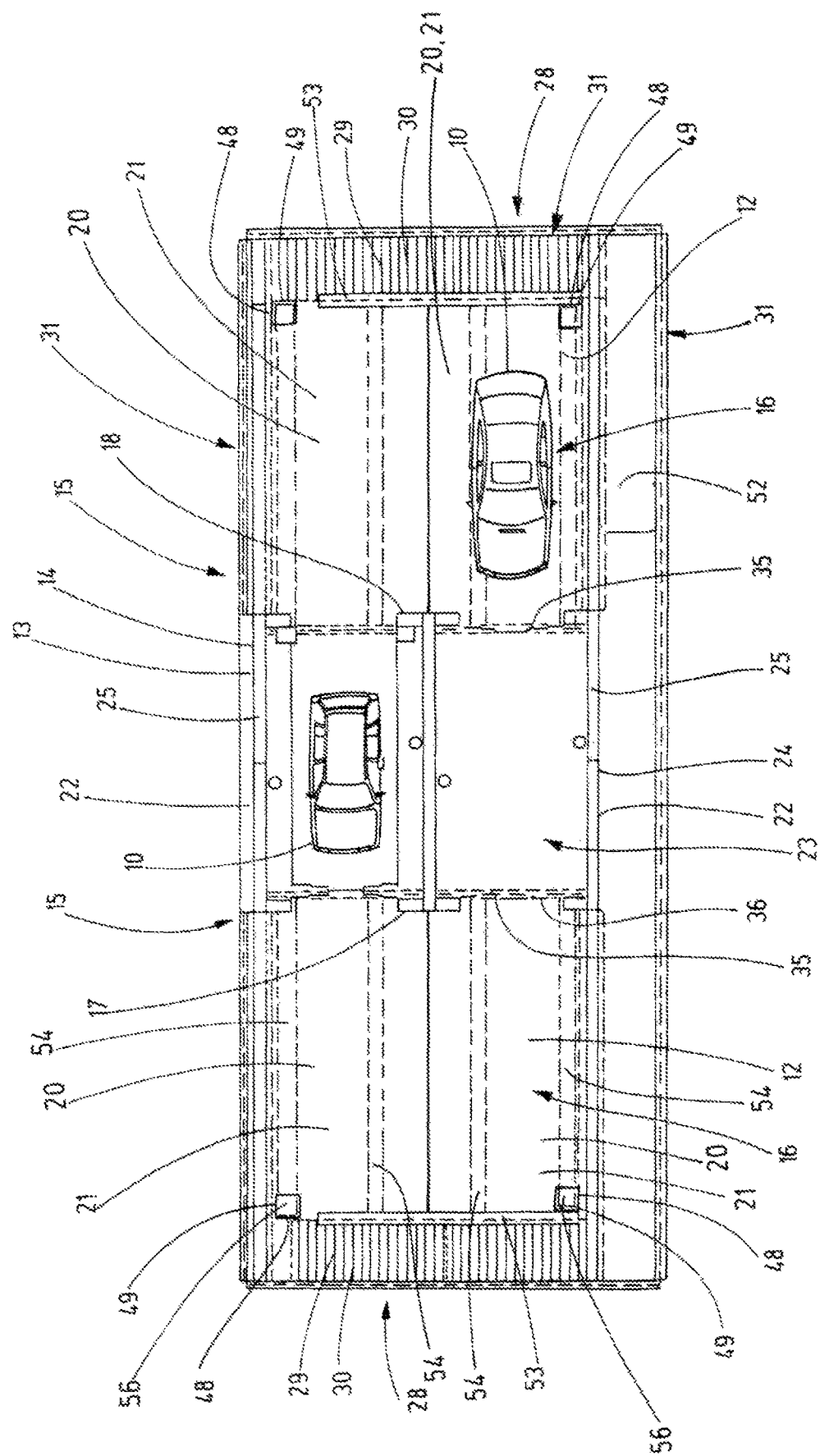
FIG. 8 is a top view of a parking floor level of a parking garage according to FIG. 7 with four parking spaces.

FIG. 8 presents a top view of a parking floor level 12 of the parking garage 100 on FIG. 7. The outer edge areas on a second side 28 of the parking floor level 12 incorporate support elements 48 designed as column elements 49. The two parking floor levels 12 on FIG. 8 each comprise two floor elements 21 or base plates 20, a first side 15 of which is arranged on a support column 13, while a second side 28 rests on the column elements 49. Integrated into each of the base plates 21 are girders 54, which are denoted by dashed lines. As depicted for the outer girders 54, the first ends 56 of the girders 54 facing away from the support structure rest on the column elements 49.

The parking floor levels 12 on FIGS. 3 and 8 additionally each comprise an impact protection fixture 53 between the parking place 16 and staircase 29. The impact protection fixture 53 consists of reinforced concrete.

Figure 9:
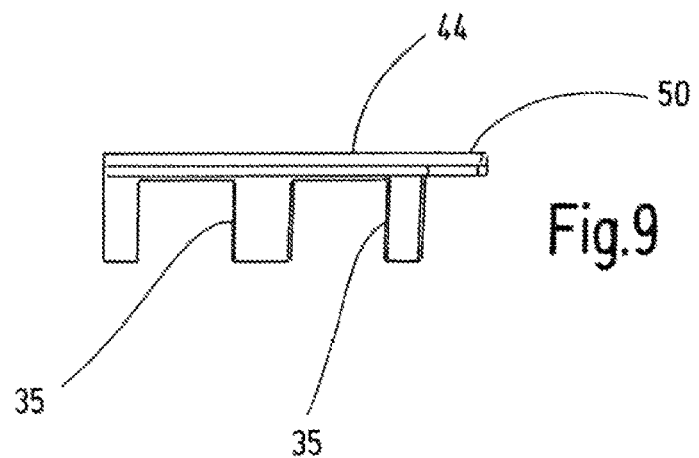
FIG. 9 is an E-portal.

FIG. 9 shows an E-portal 44. E-portals 44 are provided on the individual parking floor levels 12 and on the ground floor level 11 to reinforce the entry or exit 35 of the conveyor 25. The E-portal 44 comprises two entries or exits 35 arranged one next to the other, which allow access from the parking spaces 16 of the parking floor levels 12 to the conveyor 25. The E-portal has a protrusion 50 on one side, onto which a reinforced concrete element 52 (FIGS. 3 and 8) can be placed. The reinforced concrete element 52 serves as a surface that can be traversed by a motor vehicle owner or individuals, over which the individuals can get from one side of the parking garage 100 to the other side of the parking garage 100, and hence from one staircase 29 to the opposing staircase 29.

Figure 10:
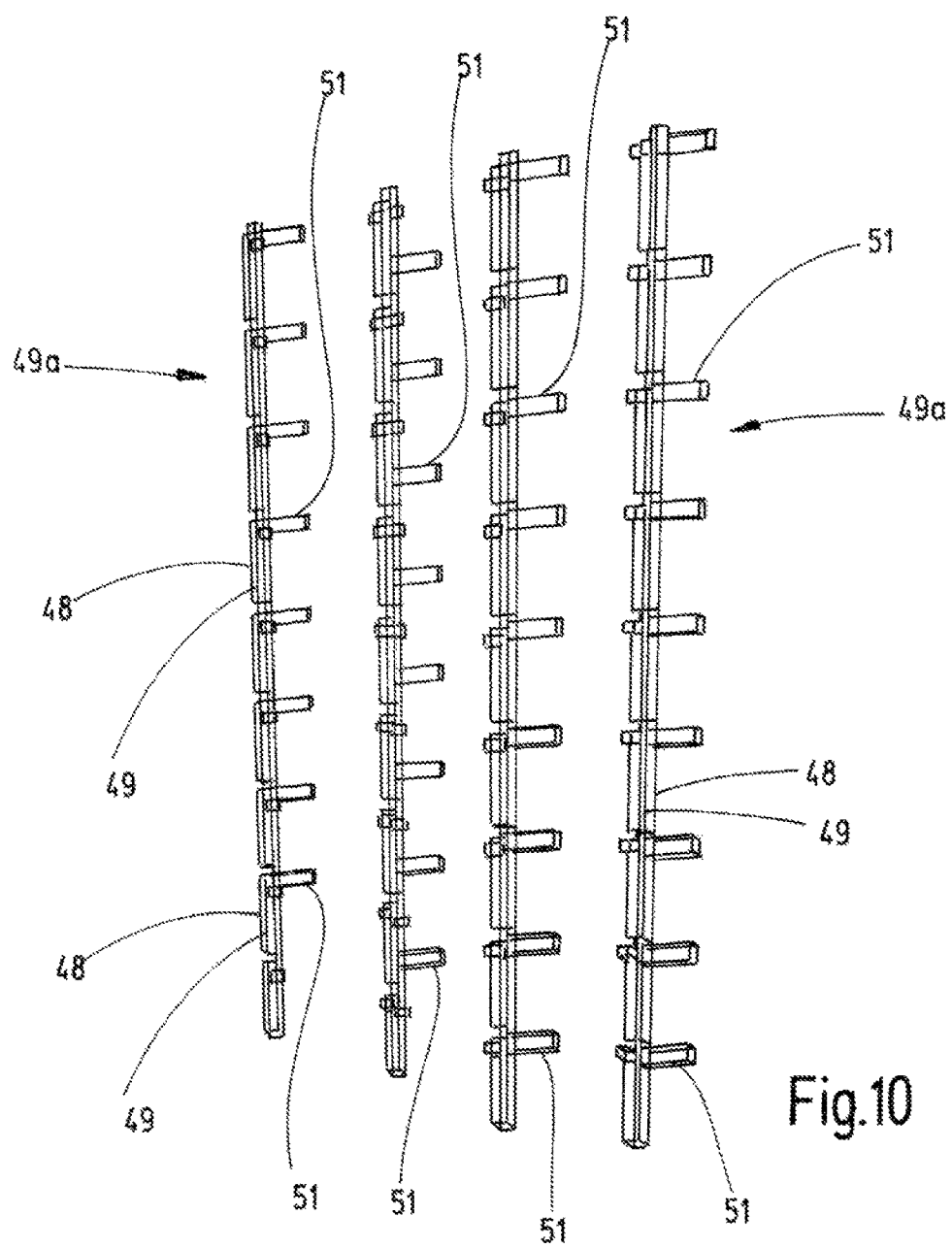
FIG. 10 is an exploded view of four essentially continuous columns comprising column elements.

FIG. 10 presents an exploded view of four essentially continuous columns 49a comprising support elements 48 that are designed as column elements 49 (FIG. 7). At expediently selected distances, supports 51 are arranged in the vertical direction of the continuous columns, and have placed upon them the stair elements of the stair structure 30 of the parking garage 100.

Figure 11:
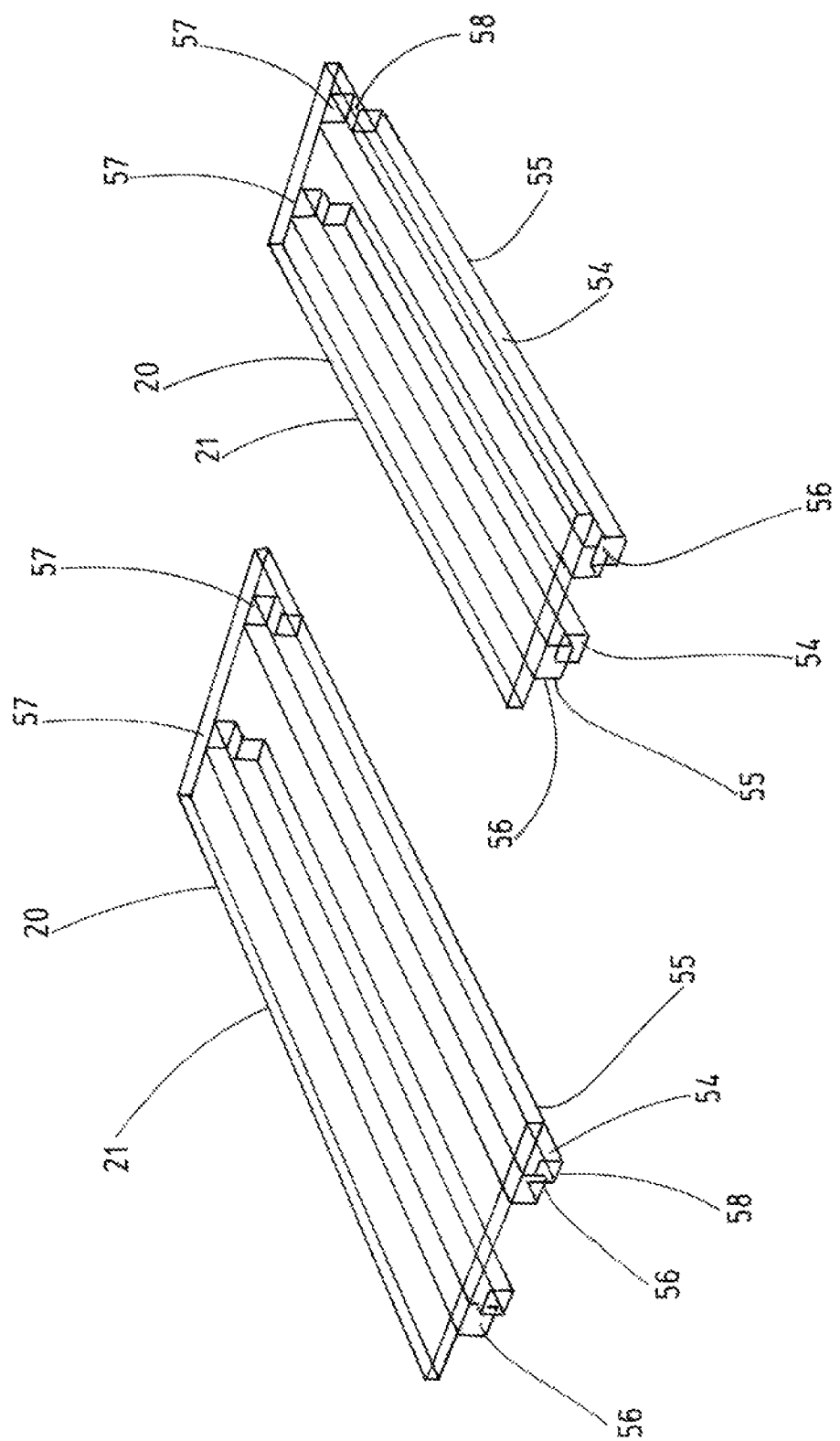
FIG. 11 shows two floor elements, acting as base plates, according to one embodiment of the parking garage of the present invention.

FIG. 11 shows two floor elements designed as base plates 20. The bottom side of the floor elements comprises a respective two oblong reinforcements 55. The reinforcements 55 comprise girders 54 integrated into the floor elements 21, in particular girders 54 made out of reinforced concrete or steel. The reinforcements or girders 54 comprise first ends 56, which can be placed onto column elements 49 (FIGS. 7 and 8). Opposing second ends 57 can be used to arrange or fasten the floor elements 21 on a support structure 14 or support column 13 to form a parking floor level 12. Notches 58 are provided at the ends 56, 57 of the reinforcements 55 or girders for attachment to the column elements 49 and support structure 14.

What is claimed:

1. A multistory garage for motor vehicles comprising
a ground floor level and at least one parking floor level located above the ground floor level,
a support column,
at least one conveyor for the vertical transport of motor vehicles,
wherein the support column comprises a shaft for the conveyor,
wherein the conveyor is situated in the shaft of the support column,
wherein the at least one parking floor level comprises at least one parking place for at least one motor vehicle, wherein the multistory garage is designed for transferring a motor vehicle between the conveyor and a parking position on the at least one parking place, the transfer being powered by the motor vehicle itself,
wherein a first side of at least one of the parking floor levels is located on the support column, wherein the multistory garage comprises an access control device,
wherein a booking system is provided, which following an identification is designed to assign a booking to a registered user,
wherein the booking system is configured to guarantee that a capacity will be present at a specific time or that a parking place can be allocated to the registered user at the specific time;
wherein the booking system is configured to check whether the registered user has booked or reserved a parking place for the specific time, and, if the registered user has booked or reserved a parking place for the specific time, the access control device gives the registered user with access authorization access to the multistory garage and to at least one parking floor level upon successful identification and wherein a parking floor level is selected automatically by identifying the registered user, and the motor vehicle along with the registered user are transported in a vertical direction to the selected floor level.

2. The multistory garage according to claim 1, wherein the at least one parking floor level with a second side of the parking floor level lying opposite the first side of the parking floor level at least one of rests on column elements, or is joined with column elements.

3. The multistory garage according to claim 1, wherein the multistory garage is a prefabricated building.

4. The multistory garage according to claim 1, wherein the conveyor is designed to transport motor vehicles and individuals with or without a motor vehicle.

5. The multistory garage according to claim 1, wherein the support column is designed to absorb essentially the entire weight of the multistory garage and all forces acting on the multistory garage.

6. The multistory garage according to claim 5, wherein the support column is centrally arranged in the multistory garage.

7. The multistory garage according to claim 1, wherein the conveyor is an elevator system designed to transport motor vehicles and individuals.

8. The multistory garage according to claim 7, wherein the elevator system is a rope traction elevator.

9. The multistory garage according to claim 1, wherein the at least one parking floor level comprises at least one floor element, wherein the at least one floor element forms at least one portion of the parking place of the at least one parking floor level.

10. The multistory garage according to claim 9, wherein the floor element is a base plate, wherein the base plate comprises reinforced concrete or consists of reinforced concrete.

11. The multistory garage according to claim 1, wherein at least one façade element is provided, wherein the façade element is transparent or partially transparent in design.

12. The multistory garage according to claim 11, wherein the façade element comprises at least one layer of wire mesh, wherein lighting elements can be arranged on the wire mesh, so as to illuminate the multistory garage.

13. The multistory garage according to claim 12, wherein the lighting elements are LED lamps.

14. The multistory garage according to claim 1, wherein a stair structure is arranged on a second side of the at least one parking floor level facing away from the support column, which connects the parking floor level with the ground floor level or with other parking floor levels.

15. The multistory garage according to claim 1, wherein at least one parking floor level comprises a charging station for charging an accumulator of an electrically driven motor vehicle.

16. The multistory garage according to claim 15, wherein the access control device comprises a camera for acquiring the license plates of motor vehicles, and wherein the booking system is designed to a parking place-related booking to an individual following the license plate acquisition.

17. The multistory garage according to claim 1, wherein the multistory garage has a width of between 5 in and 20 m, and wherein the multistory garage has a length of between 10 m and 40 m.

18. The multistory garage according to claim 17, wherein the multistory garage has a width of between 7 m and 12 m, and wherein the multistory garage has a length of between 20 m and 30 m.

19. The multistory garage according to claim 1, wherein the multistory garage comprises a modular structure, wherein at least one of the at least one shaft wall element or the at least one cantilever or the at least one girder or the at least one floor element or the at least one U-portal or the at least one stair structure are prefabricated.

* * * * *